(12) United States Patent
Reshadi et al.

(10) Patent No.: US 10,592,292 B2
(45) Date of Patent: Mar. 17, 2020

(54) METHOD AND APPARATUS FOR OPTIMIZED EXECUTION USING RESOURCE UTILIZATION MAPS

(71) Applicant: QUALCOMM Incorporated, San Diego, CA (US)

(72) Inventors: Mehrdad Mohammad H. Reshadi, Santa Clara, CA (US); Babak Salamat, Santa Clara, CA (US); Gheorghe C. Cascaval, Santa Clara, CA (US); Mark S. Fowler, El Cerrito, CA (US); Andrey Ermolinskiy, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/603,863

(22) Filed: May 24, 2017

(65) Prior Publication Data
US 2017/0255497 A1  Sep. 7, 2017

Related U.S. Application Data

(62) Division of application No. 13/082,650, filed on Apr. 8, 2011, now Pat. No. 9,804,893.

(51) Int. Cl.
*G06F 3/048* (2013.01)
*G06F 9/50* (2006.01)
*G06F 3/0481* (2013.01)

(52) U.S. Cl.
CPC .......... *G06F 9/5061* (2013.01); *G06F 3/0481* (2013.01)

(58) Field of Classification Search
None
See application file for complete search history.

(56) References Cited

U.S. PATENT DOCUMENTS 8,650,426 B2   2/2014  Rychlik et al.
9,563,250 B2   2/2017  Rychlik et al.
(Continued)

FOREIGN PATENT DOCUMENTS

CN    1825289 A    8/2006
CN  101025674 A    8/2007
(Continued)

OTHER PUBLICATIONS

50 Choice Tips!! Windows XP Super High Speedup Comprehensive, Windows Server World, Japan, IDG Japan Inc., Jan. 1, 2005, vol. 10 (1), p. 49.
(Continued)

*Primary Examiner* — Thanh T Vu
(74) *Attorney, Agent, or Firm* — The Marbury Law Group/Qualcomm

(57) ABSTRACT

Systems and methods enable displaying a graphical representation of system resource usage in a resource utilization map to inform users about system resource utilization by applications and processes running on a computing device. Users may provide inputs to enable the system to adjust resource allocations based on user preferences. This may enable users to improve the overall operational performance of the device consistent with their current personal preferences by identifying applications or processes of most or least interest so the device processor to prioritize system resources accordingly. Some aspects transmit resource allocation data based on such user input to a central server to enable community based resource allocation schemes. Community based resource allocation schemes may be transmitted to computing devices for use as default or preliminary resource allocations for particular applications, websites or device operating states.

24 Claims, 13 Drawing Sheets

(56) References Cited

U.S. PATENT DOCUMENTS

| | | |
|---|---|---|
| 2003/0006988 A1 | 1/2003 | Alford et al. |
| 2003/0142109 A1 | 7/2003 | Brown et al. |
| 2003/0142139 A1 | 7/2003 | Brown et al. |
| 2003/0142140 A1 | 7/2003 | Brown et al. |
| 2003/0142141 A1 | 7/2003 | Brown et al. |
| 2003/0142143 A1 | 7/2003 | Brown et al. |
| 2003/0143141 A1 | 7/2003 | Schwefer et al. |
| 2005/0149940 A1 | 7/2005 | Calinescu et al. |
| 2005/0216663 A1 | 9/2005 | Fujibayashi |
| 2006/0277206 A1 | 12/2006 | Bailey et al. |
| 2007/0150599 A1* | 6/2007 | Neogi ............... G06F 9/5061 709/227 |
| 2009/0125911 A1* | 5/2009 | Lazarus ............. G06F 9/5011 718/104 |
| 2009/0168661 A1 | 7/2009 | Lingafelt et al. |
| 2009/0237404 A1 | 9/2009 | Cannon, III |
| 2010/0031157 A1 | 2/2010 | Neer et al. |
| 2010/0082505 A1 | 4/2010 | Hollingsworth et al. |
| 2010/0125657 A1 | 5/2010 | Dowling et al. |
| 2012/0260179 A1 | 10/2012 | Reshadi et al. |

FOREIGN PATENT DOCUMENTS

| | | |
|---|---|---|
| JP | 2002342122 A | 11/2002 |
| JP | 2010237787 A | 10/2010 |
| WO | 2008068505 A1 | 6/2008 |

OTHER PUBLICATIONS

International Search Report and Written Opinion—PCT/US2012/032523, International Search Authority—European Patent Office, dated Jul. 26, 2012.

Microsoft,"Task manager overview", Sep. 26, 2010 (Sep. 26, 2010), XP002679747, Retrieved from the Internet: URL:http://web.archive.org/web/20100926001708/http://www.microsoft.com/resources/documentati on/windows/xp/all /proddocs/en-us/taskman_whats_there_w.mspx?mfr=true [retrieved on Jul. 12, 2012] the whole document.

Throttled Pro 1.5.1, Apple Downloads, Internet Utilities, Nov. 15, 2010, 3pgs.

* cited by examiner

METHOD AND APPARATUS FOR OPTIMIZED EXECUTION USING RESOURCE UTILIZATION MAPS

RELATED APPLICATIONS

This application is a divisional of U.S. patent application Ser. No. 13/082,650 entitled "Method and Apparatus for Optimized Execution Using Resource Utilization Maps" filed Apr. 8, 2011, the entire contents of which are incorporated herein by reference.

FIELD OF THE INVENTION

The present invention relates generally to resource allocation in computing devices and more particularly to optimized resource allocation based on user responses to a graphical representation of resource utilization.

BACKGROUND

Mobile devices (e.g., smart phones) are now being pushed to perform extensive computations and communicate large amounts of data. While the processors and wireless modems used in modern mobile devices have impressive capacities, modern applications, and uses often push the limits of processing capacity and communication bandwidth. Often the applications or processes that are the heavy users of processing and/or communication bandwidth are operating in the background (e.g., updates to applications, downloads of ads or background information, etc.). As a result of unseen or unknown processes/applications demanding processing capacity or bandwidth, users may become frustrated with the sluggish performance of their devices. Non-technical users are interested in what their devices do and what is presented on the screen, not in the background processes and device resources that make such functionality possible.

Different parts of an application contribute differently to the perceived user experience. For example, when a user visits a web page, she might be interested only in a small part of the page, but the ads in the page may consume most of the processing power, communication bandwidth, and battery energy required to present the page on the screen. As another example, while a user is watching a video, a background process (e.g., a weather application data download) might start accessing the network and consume a portion of the communication bandwidth that the user would prefer to be used for watching the video. From the user's perspective, the resources used by these tasks are wasted. Current tools for monitoring resource usages are beyond the understanding of non-technical users, Even technical users find it difficult to tune the system manually by checking the process list, enabling and disabling background services, studying their resource usage, and relating them back to actual behavior of applications of interest. Since there is no such mechanism for normal users, mobile devices typically do not provide fine grained mechanisms for customizing resource usage.

SUMMARY

The various aspects include a user interface method executed on a computing device including translating resource utilization information of the computing device into a graphical representation including one or more visual indicators illustrating usage of a resource by a corresponding display element, and displaying the graphical representation (either manually or automatically at certain times or conditions) so that each visual indicator is aligned with its corresponding display element.

The various aspects may include a user interface method that may be executed on a computing device, translating information regarding resource utilization of the computing device by one or more of a function, a process, an application, a component of a process, and a component of a application into a resource utilization map including a visual indicator illustrating usage of a resource by the one or more of a function, a process, an application, a component of a process, and a component of a application, and displaying the resource utilization map so that the visual indicator is aligned with a corresponding display element. The aspect methods may further include obtaining the resource utilization information.

In an aspect translating information regarding resource utilization of the computing device by the one or more of a function, a process, an application, a component of a process, and a component of a application into a resource utilization map may include translating information regarding resource utilization into a heat map resource utilization map wherein the visual indicators illustrating usage of a resource by a process or application comprise generating a color overlay display indicating relative resource utilization of processes corresponding to display elements in terms of color.

In an aspect translating information regarding resource utilization of the computing device by the one or more of a function, a process, an application, a component of a process, and a component of a application into a resource utilization map may include translating information regarding resource utilization into a bar graph resource utilization map wherein the visual indicators illustrating usage of a resource by a process or application comprise bar graphs presented in conjunction with display elements that indicate relative resource utilization of processes corresponding to the display elements in terms of height of bars in the bar graph.

In an aspect translating information regarding resource utilization of the computing device by the one or more of a function, a process, an application, a component of a process, and a component of a application into a resource utilization map may include translating information regarding resource utilization into an elevation resource utilization map wherein the visual indicators illustrating usage of a resource by a process or application comprise shadows applied to display elements that indicate relative resource utilization of processes corresponding to the display elements in terms of a size of shadows.

In an aspect translating information regarding resource utilization of the computing device by the one or more of a function, a process, an application, a component of a process, and a component of a application into a resource utilization map may include translating information regarding resource utilization into an elevation resource utilization map wherein the visual indicators illustrating usage of a resource by a process or application comprise an elevation display elements that indicate relative resource utilization of processes corresponding to the display elements in terms of a relative elevation with respect to other display elements.

In an aspect translating information regarding resource utilization of the computing device by the one or more of a function, a process, an application, a component of a process, and a component of a application into a resource utilization map may include translating information regarding resource utilization into a resource utilization map in which the visual indicators illustrating usage of a resource by a process or application comprise indicators positioned on a periphery of the computing device display.

In an aspect translating information regarding resource utilization of the computing device by the one or more of a function, a process, an application, a component of a process, and a component of a application into a resource utilization map may include translating information regarding resource utilization by applications stored on the computing device wherein the visual indicators indicate resource usage when the application is run on the processor.

In an aspect translating information regarding resource utilization of the computing device by the one or more of a function, a process, an application, a component of a process, and a component of a application into a resource utilization map may include translating information regarding resource utilization into a resource utilization map indicating resource utilization by background processes not associated with a display element wherein the visual indicators illustrating usage of a resource by a process or application comprise a display of indicators identifying both the background process and a relative resource utilization by the background process.

In an aspect translating information regarding resource utilization of the computing device by one or more of a function, a process, an application, a component of a process, and a component of a application into a resource utilization map may include translating information regarding resource utilization of the computing device by the one or more of a function, a process, an application, a component of a process, and a component of a application into a plurality of resource utilization maps each corresponding to one of a plurality of system resources and each including a visual indicator illustrating usage of the one of the plurality of system resources by the one or more of a function, a process, an application, a component of a process, and a component of a application. In an aspect, translating information regarding resource utilization of the computing device by the one or more of a function, a process, an application, a component of a process, and a component of a application into a resource utilization map may include translating information regarding utilization of first and second resources into a bubble resource utilization map comprising a bubble image wherein the visual indicator illustrating usage of the first resource is a diameter of the bubble and the visual indicator illustrating usage of the second resource is one of a color or an intensity of the bubble.

The methods may further include receiving a user input in response to the displayed resource utilization map, and allocating resources of the computing device based on the received user input, in which allocating resources of the computing device may include directly allocating resources of the computing device based on the received user input, indirectly allocating resources of the computing device based on the received user input using operating system mechanisms, and adjusting one or both of a priority setting and a resource permission.

A further aspect includes a computing device including a memory and a display coupled to a processor in which the processor is configured with processor executable instructions to perform operations of the methods described above. A further aspect includes a computing device including means for performing the operations of the methods described above. A further aspect includes a non-transitory processor-readable storage medium having stored thereon processor-executable instructions configured to cause a processor of a computing device to perform operations of the methods described above.

A further aspect may include a resource optimization method executed on a central server including receiving from several computing devices resource allocation data based on user inputs in response to a displayed graphical representation including one or more visual indicators illustrating usage of a resource by a corresponding display element, generating a resource allocation scheme based on the received resource allocation data, and transmitting the resource allocation scheme. This aspect method may be executed on a central server and include receiving from a plurality of computing devices resource allocation data based on user inputs in response to a displayed graphical representation including one or more visual indicators illustrating usage of a resource by a corresponding display element, generating a community resource allocation scheme based on the received resource allocation data, and transmitting the community resource allocation scheme. In various aspects, the received resource allocation data include one or more of user preferences, user inputs received by each of the plurality of computing devices in response to a displayed resource utilization map, and one or both of a priority setting and a resource permission set in each computing devices equipped to receive user inputs in response to a displayed resource utilization map. A further aspect includes a server configured with processor executable instructions to perform operations of this method. A further aspect includes means for accomplishing the functions of this method. A further aspect includes a non-transitory computer-readable storage medium having stored thereon server-executable instructions configured to cause a server to perform operations of this aspect method.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
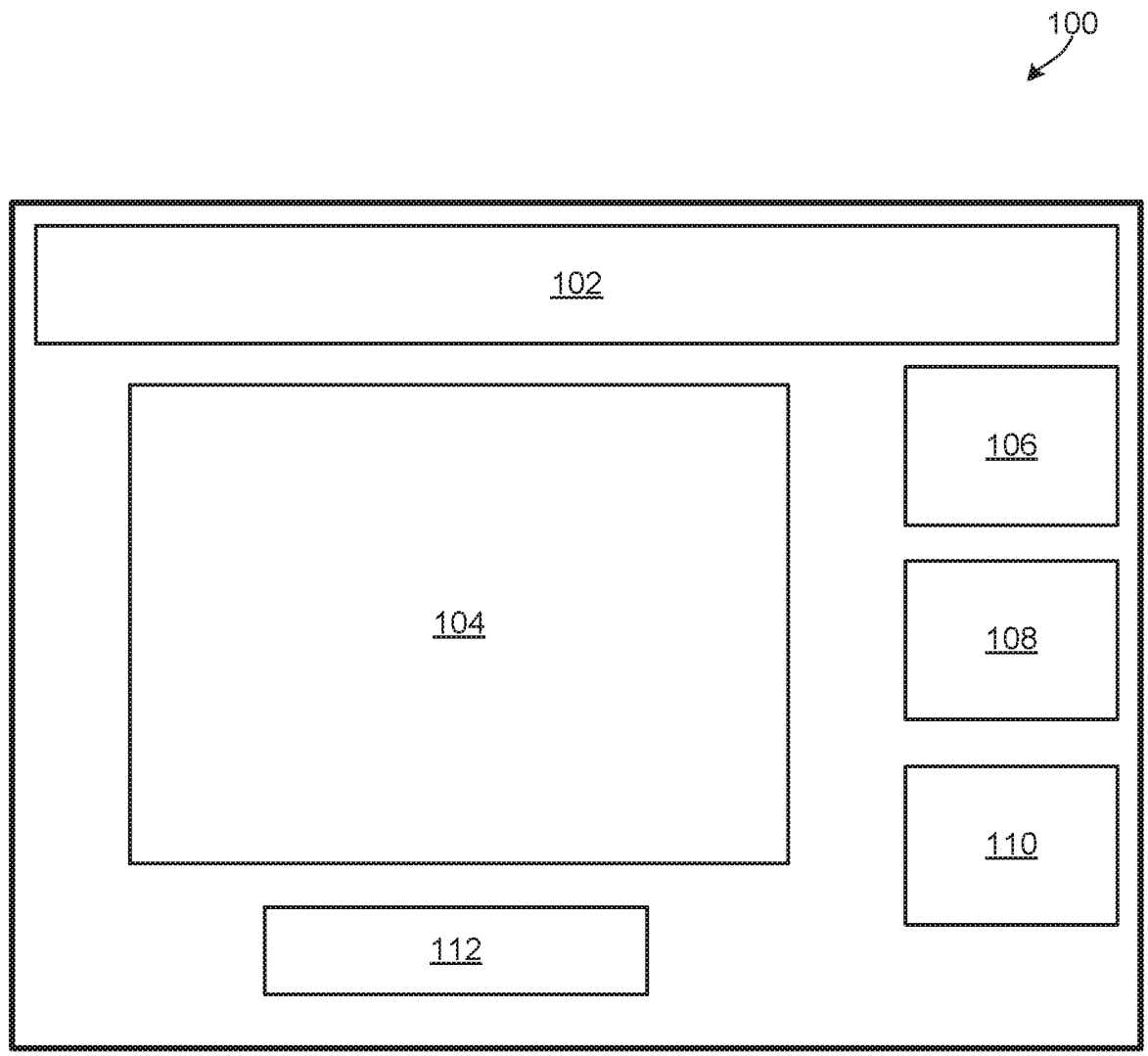
FIG. 1 is a diagram of an example application window made up of several subcomponents.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" and "mobile device" refer to any one or all of cellular telephones, personal television receivers, personal data assistants (PDAs), palm-top computers, notebook computers, personal computers, wireless electronic mail receivers, cellular telephone receivers (e.g., the Blackberry® and Treo® devices), multimedia Internet enabled cellular telephones (e.g., the Blackberry Storm®), and similar electronic devices that include a programmable processor, memory, and a display.

Various processes and applications running on a computing device often compete for the same system resources. This can result in some applications or processors running slower or otherwise exhibiting less than optimal performance. If resources are being dedicated to processes or applications in which the user has little or no interest, the result may be user frustration and a diminished user experience. Thus, it would be beneficial to enable a user to allocate or prioritize resources to supporting a particular process or application so as to improve the performance of the computing device on the process in which the user is interested most.

Although tools for monitoring the resources consumed by various processes and applications on a computing device are available, such tools are generally too complicated for most users. Current task managers or other means for monitoring resource utilization information often present complicated statistics or long lists of process names an average user may not understand. Non-limiting examples of such resources include amount of CPU time, amount of memory, energy consumed, network bandwidth, etc.

The various aspects disclosed herein address these user needs and overcome limitations of prior known tools by providing systems and methods which display a graphical representation of system resource usage. Such a graphical representation of system resource usage is referred to herein as a resource utilization map. Resource utilization maps in the various aspects are configured to inform a computing device user through visual indicators about relative amount of system resources used by functions, applications, processes, components of processes, and components of applications running on the device, particularly those which are consuming a majority of system resources. Users may interact with such resource utilization maps to provide input regarding processes or applications which should be emphasized or deemphasized. For example, users may touch portions of the resource utilization map to indicate that resource priorities for the corresponding application or processes should be increased or reduced. Operating system of the computing device may be configured to adjust the priorities and resource permissions applied to various applications and processes based on one or more user inputs received in response to the graphical representation of resource utilization. In this manner, users can interact with their computing device to improve its overall operational performance consistent with their current personal preferences by enabling the device processor or processors to concentrate system resources on applications or processes of most interest and limiting resource utilization by applications or processes of little or no interest to the user.

In a further aspect, computing devices may be configured to transmit to a central server information regarding resource allocation priorities made in response to user inputs. Data from a plurality of computing devices may be received on such a central server, where the data may be used to generate community based resource allocation schemes reflective of the resource preferences of a majority of computing device users. Such community-based resource allocation schemes may be transmitted to one or more computing devices. Computing devices receiving such community-based resource allocation schemes may use such resource allocation information for setting device priorities, such as to preliminarily prioritize resources against processes and applications prior to receiving user inputs via a resource utilization map.

A resource utilization map according to the various aspects may be configured to inform users regarding programs or processes that are using one or more system resources of a computing device. A resource utilization map is a display of information generated by a processor or processors of the computing device which may be configured to present the information in a manner that can be easily understood by typical users without requiring knowledge of the technical details of the computing device and the applications and processes that it runs. This visual indication may allow for relatively quick and easy comparisons by users of the resource demands of various applications, as well as identifying functions, processes, applications, components of processes, and components of applications that may be causing undesirable performance issues.

In various aspects, a resource utilization map may be presented in conjunction with one or more windows or displays presented on a computing device display. As an example, an application window 100 is shown in FIG. 1. As shown in FIG. 1, applications such as a web browser presenting a downloaded webpage typically generate visual displays which include a variety of display elements, some or all of which may correspond to or be generated by processes or applications consuming system resources. FIGS. 2A-6 illustrate examples of alternative resource utilization map implementations according to various aspects, which overlay graphics or otherwise modify image elements appearing on the sample application window 100. In some aspects, a resource utilization map may be presented as a layer above the application window or other display. The overlaid resource utilization map may include visual illustrations or indicators that an element of the display is using resources but otherwise avoid blocking the display. Further aspects may incorporate the resource utilization map into the display itself. A resource utilization map may also be applied to menu displays, such as a series of icons as shown in FIG. 7.

In some aspects, the user of a computing device may respond to a displayed resource utilization map by selecting particular functions, processes, applications, components of processes, or components of applications (e.g., by touching the image element on a touch screen display) to communicate the user's preferences, so the computing device can use such user inputs to prioritize or reallocate system resources. User resource prioritization preference inputs may be received via any form of user input, such as clicking with a mouse or touching a touch screen. For example, a user may click on a resource utilization map's visual indicator associated with a display element to select the application or process corresponding to that element for priority assignment of system resources, or limiting or denying system resources. Based on the user selection, the computing device processor or processors (or more accurately an application or component of the operating system executing on the processor(s)) may reallocate system resources among the currently running applications and processes. The display element selected by the user may be associated with a single or multiple underlying processes, so the user selection may impact system resource allocations to multiple processes. In some aspects, the resource utilization map may provide information regarding underlying processes or applications for which there is no corresponding visual element, thereby enabling users to communicate their preferences regarding background processes that the user might not be aware of otherwise.

When a user input identifies a process or application for which priority is preferred, the computing device processor (or processor's operating system) may make a resource utilization decision to ensure that selected applications or processes have preferential access to system resources. In the case where user input identifies applications or processes that are not preferred (e.g., display elements for which the user has little or no interest), the processor (or processors in a multi-processor device) or processor operating system may make resource allocation decisions which limit or deny system resources to the selected elements, including terminating underlying processes in some cases. This may allow the device processor or processors to shift system resources away from the processes associated with a selected element, thereby making those resources available to other applications and processes operating on the device.

In this manner, the resource utilization map may serve as a type of graphical user interface to enable users to influence the normal processes of system resource management. A user need not know about or understand the relationship between display elements and their underlying processes, since such relationships are graphically presented in the resource utilization map. Instead, a user may review the resource utilization map to understand where system resources are being used, and select display elements which the user would prefer to see emphasized or deemphasized. The computing device may then use that user input to automatically reallocate resources to accommodate the user's indicated preferences.

FIG. 1 illustrates a sample application window 100 in the form of a webpage generated by a web browser. Application windows may include various application displays or graphical user interfaces active on a computing device, such as a web browser. An application window may include several subcomponents. Sample application window 100 may be a web page including subcomponents, 102, 104, 106, 108, 110, and 112. Each of these subcomponents may display a different form of content or run different processes that rely on different resources. For example, one subcomponent 102 may be an advertisement, such as a banner in Adobe Flash, while another subcomponent 104 may be a video window. The web page may also include plain or formatted text arranged in various places. Further, some components may include forms of JavaScript animation, such as subcomponent 112, and different AJAX widgets such as subcomponents 106, 108, and 110. The arrangement of subcomponents illustrated in FIG. 1 is just an example, and it will be appreciated by one of skill in the art that web pages come in a wide variety of forms, with a wide variety of different types of display elements and corresponding background processes. While a web browser webpage display is used to illustrate the various aspects, the aspects and the claims are not limited to web browsers, and are generally applicable to any form of display that may be presented by a computing device. Also, references to application windows are for illustration purposes only and are not intended to exclude other types of displays, such as menus, desktop displays, etc.

Figure 2A:
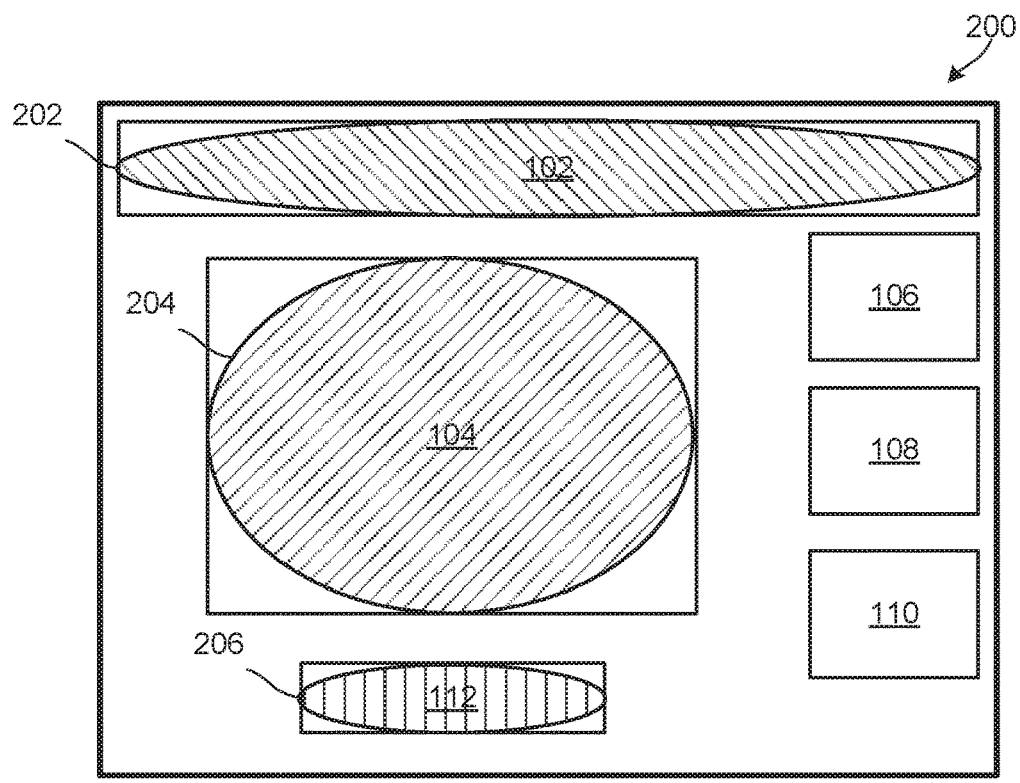
FIGS. 2A and 2B are diagrams of the example application window showing a resource utilization map overlaid on the window revealing resource utilization in the form of a heat map.
Figure 2B:
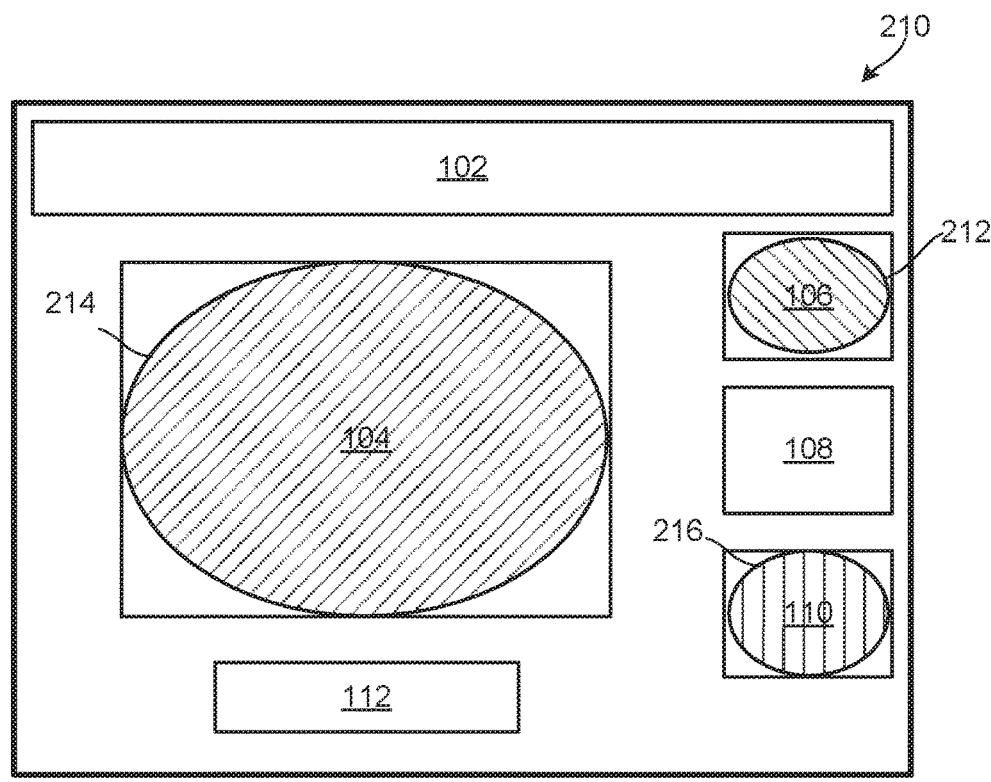

FIG. 2A illustrates a resource utilization map 200 according to an aspect in which the map is presented as an overlay of the application window. This resource utilization map 200 provides relative information regarding the resource utilization of application server processes supporting different display subcomponents by means of a heat map or shading that overlays the display. For example, some components whose corresponding applications or processes are consuming a large amount of system resources may be overlaid by a color or shading that indicates the relative resource utilization through color or the darkness of the shading. In this aspect, the resource utilization map 200 may resemble a heat map as if an infrared image were being projected on the display with the colors indicating temperature and temperatures reflecting the amount of resources consumed by the processes corresponding to the underlying display elements. Users may be familiar with the concept of heat maps from movies and television programs that feature infrared and night vision imaging. Thus, the heat map resource utilization map provides an easy to understand displayed relative resource utilization that many users will find easy to understand and manipulate. In such aspects, the colors used in the heat map display may employ colors that are typically associated with cool warm and hot temperatures, such as blue for indicating components with low resource utilization orange or red for indicating components with high resource utilization. The different colors or shading are illustrated in FIGS. 2A and 2B in the form of different hatching patterns.

For example, in FIG. 2A, display subcomponents 106, 108, and 110 are static elements and therefore any underlying processes are not consuming significant system resources, such as communication bandwidth. Therefore, display subcomponents 106, 108, and 110 are not overlaid with a shading in the resource utilization map. In the illustrated example, the underlying processes corresponding to display subcomponent 102 is consuming a moderate amount of system resources. Therefore, the resource utilization map 200 may include a cool color (e.g., light blue) shaded portion 202 overlaying that display subcomponent 102. In the illustrated example, the underlying processes corresponding to display subcomponent 112 are utilizing more system resources than subcomponent 102, and therefore the resource utilization map 200 includes a shaded portion 206 featuring a warmer color (or darker shading) overlaying the display components 112. In the illustrated example, the underlying processes corresponding to display subcomponent 104 are utilizing the most system resources, and therefore the resource utilization map 200 may include an overlaying shaded portion 204 in a hot color (e.g., orange or red) to graphically represent the subcomponent's heavy resource usage.

Computing devices include many different types of resources that are utilized by applications and processes, including memory, processor computation time, communication network bandwidth, internal data bus utilization, and power (e.g., relative battery drain). For example, FIG. 2B illustrates a second resource utilization map 210 indicating the relative utilization of a system resource different from that shown in FIG. 2A. For example, shading in resource utilization map 200 may be based on bandwidth usage while the shading of resource utilization map 210 may be based on use of processing power. Thus, in the illustrated examples, the display subcomponents 106 and 110 correspond to applications or processes that are not communicating with other computers, and thus not using any communication bandwidth as indicated in FIG. 2A, but are demanding processor computation time, and thus are overlaid with a hot color (or dark) shading portions 212, 214, and 216 in FIG. 2B. Thus, the two resource utilization maps illustrated in FIG. 2A and FIG. 2B inform a user as to the different types and relative amounts of system resources utilized by applications or processes corresponding to the various display elements.

A resource utilization map may be generated to graphically represent the utilization of any single system resource or combination of resources. For example, one system utilization map may be generated to reflect the relative use of processor computation time (e.g., discussed above with reference to FIG. 2B), another resource utilization map may be generated to reflect the relative utilization of communication bandwidth (e.g., discussed above with reference to FIG. 2A), and a further resource utilization map may be generated to reflect the device power consumption (which is relative to the battery utilization). Such multiple resource utilization maps may be generated simultaneously, and overlaid on the display at the user's selection. For example, the user may sequentially select different resource utilization maps in order to understand the relative use of different system resources. Multiple resource utilization maps may also be presented on top of each other. In aspects that enable the simultaneous overlay of multiple resource utilization maps, each resource utilization map may use a different color scheme, range of shading intensities, or overlays shapes so that the resulting combination map is understandable.

In some aspects, resource utilization maps may be generated to reflect the utilization of combinations of resources. For example, a single resource utilization map may be generated to reflect a combination of both memory and processor usage. In such combination resource utilization maps, the usage of different resources may be differentiated through the overlay formatting, such as by using different symbols, colors or shapes to correspond to different system resources. For example, a resource utilization map may include shading of two different colors where each color corresponded to a different resource. As another example, the shape of the overlaying shading may indicate the type of resource addressed by the shading, such as square shading indicating processor utilization and elliptical shading indicating memory utilization.

In various aspects, the resource utilization map may be selectively actuated by users, such as by a user pressing a button or making some other user interface selection. Enabling the resource utilization map to be selectively actuated by the user prevents the resource utilization map from interfering with a user's normal use of the computing device, such as to view the underlying display. Users may selectively activate different resource utilization maps in order to understand the relative use of different resources by active applications and processes. For example, a user may be viewing content, such as a video or a game, when unsatisfactory performance is noticed (e.g., slow responses or flickering display). To investigate the cause, the user may toggle on a resource utilization map to see the relative resource usage of various processes corresponding to the display elements, and then toggle off map to return to viewing the game or video. The user may select multiple resource utilization maps in an attempt to identify processes or applications that may be deactivated or assigned lower priority in order to improve the device performance.

For example, referring to FIGS. 2A and 2B, a user may toggle between resource utilization map 200 and resource utilization map 210, or turn on both resource utilization maps at the same time. A combined resource utilization map based on both resources may also be generated and presented, such as in response to activating both resource utilization maps. Further, portions of the resource utilization map may be turned on or off separately, such as by selectively activating the resource utilization map for a single display subcomponent or multiple display subcomponents. Also, as discussed below, a resource utilization map may be turned on to review the relative use of system resources by processes that do not have a corresponding display element.

Since applications and processes may use some types of system resources for brief instances, the resource utilization at any given instant may not accurately reflect the performance impact that various applications or processes may haves. For example, processes may require brief computations by the processor several times per second, such that the frequent utilization of the processor computation capabilities may impact the performance of other applications or processes running on the device. For this reason, the resource utilization map may be based upon a time averaged utilization of some resources. Resource utilization maps may be based on utilization averaged over different amounts of time. Additionally, different resource utilization maps may be generated to represent average resource usage over different amounts of time. For example, one resource utilization map could represent average power use over the preceding 10 seconds, while another resource utilization map may represent average power use over the preceding 24 hours. A user may toggle between these different time averaged resource utilization maps to understand how various applications and processes are draining the battery over the short and long-term.

In the various aspects, the resource utilization map may be configured as a user interface, enabling a user to provide inputs regarding preferences by touching or selecting portions of the resource utilization map. For example, a user may want to dedicate more of the computing device's communication bandwidth to a streaming video presented in display subcomponent 104 to ensure the video does not lag or pause due to buffering. With resource utilization map 200 turned on, the user may see that display subcomponents 102 and 112 correspond with underlying applications or processes that are also using the device's communication bandwidth. In this situation, the user may interact with a user interface, such as by touching the resource utilization map on a touch screen display, in order to indicate that the processes associated with display subcomponent 104 should receive more communication bandwidth, or to indicate that the processes associated with display subcomponents 102 and 112 should be granted limited access to communication bandwidth (or be deactivated). This user input may be in the form of the user clicking on portion 204 or subcomponent 104 using a computer mouse. The input may also be received through any other type of computing device user interface, such as a touch screen, keyboard, microphone, or sensor. In response to this user input, computing device processor may reallocate communication bandwidth to the streaming video being presented in the display subcomponent 104.

Figure 3:
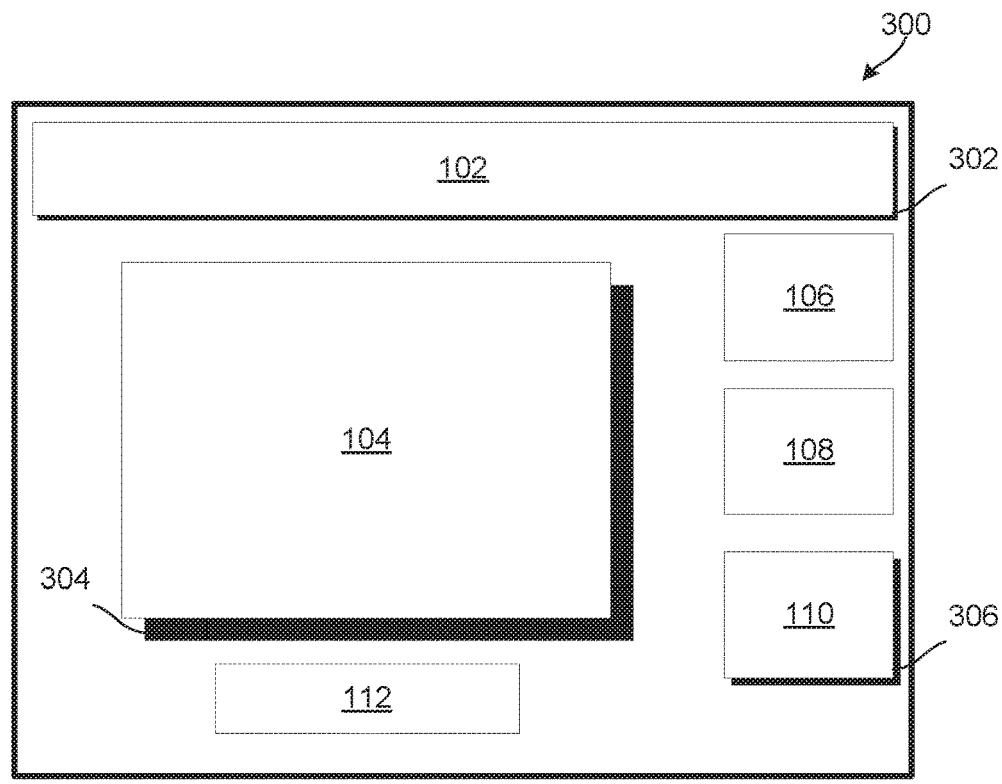
FIG. 3 is a diagram of the example application window showing a resource utilization map overlaid on the window revealing resource utilization in the form of shadows.

While FIGS. 2A and 2B illustrate a "heat map" type of resource utilization map, other types of graphical representations of a resource utilization may be used. FIG. 3 illustrates an exemplary resource utilization map 300 in which the resource utilization of processes associated with display subcomponents are represented by the degree of elevation or shadowing of each display element. In this example aspect, each display subcomponent may be assigned a height corresponding to the resource usage by corresponding applications and processes. Thus, greater resource utilization usage may be indicated with a greater height representation on the display. Height may be indicated by shadows or other artificial elevation techniques on two-dimensional displays, or by the elevation shown on three dimensional displays. For example, the illustrated resource utilization map 300 applies shadows 302, 304, and 306 of different depths to display subcomponents 102, 104 and 110 to reveal the resource utilization of the corresponding applications or processes. Display subcomponents 106, 108, and 112 are not raised or shaded, which indicates the processes associated with the display subcomponents are not using significant amounts of the system resources. Shadow 306 is larger than shadow 302 indicating that the processes corresponding to display subcomponent 110 are using more system resources than the processes corresponding to display subcomponent 102. Shadow 304 is larger than both shadows 306 and 302, indicating that the processes corresponding to display subcomponent 104 are using more of the system resources than the processes corresponding to either of display subcomponents 102 and 110.

Figure 4:
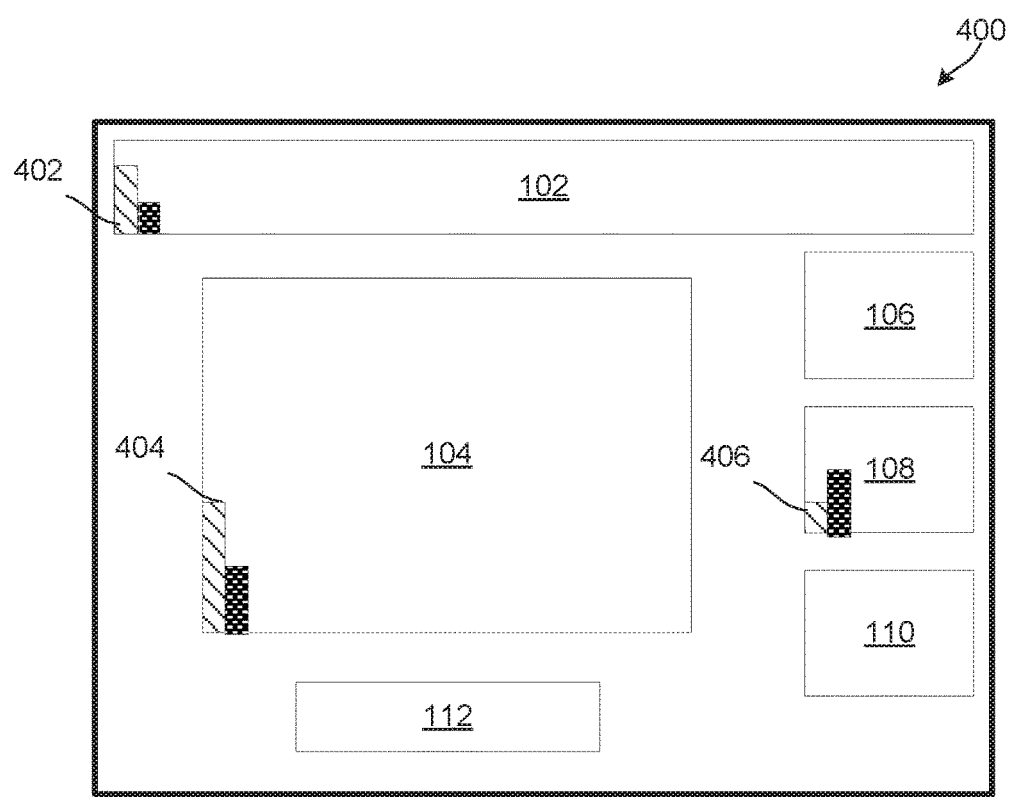
FIG. 4 is a diagram of the example application window showing a resource utilization map overlaid on the window revealing resource utilization in the form of bar graph displays.

FIG. 4 illustrates another example resource utilization map 400 in which the resource usage by processes corresponding to display subcomponents are indicated by bar graphs overlaid on a portion of each display element. In this aspect, a taller bar may indicate greater resource usage. Aspects may provide multiple bars per display subcomponent to reflect the relative utilization of different types of system resources. For example, the illustrated resource utilization map 400 includes a two bar display for several subcomponents. In such an aspect, one bar may indicate the relative amount of memory utilized by processes corresponding to the display subcomponent, while the other bar may indicate network bandwidth used by processes corresponding to the display subcomponent. For example, bar display 402 may indicate that the processes corresponding to display subcomponent 102 have relatively high memory use and are utilizing a moderate amount of the available communication bandwidth. Similarly, bar display 404 may indicate that processes corresponding to display subcomponent 104 are using more memory and a larger portion of the available communication bandwidth, while bar display 406 may indicate that the processes corresponding to display subcomponent 108 are using a larger portion of the available communication bandwidth than component 102 but demanding less memory space.

In this aspect, the size of bars in the resource utilization map may vary with the resource usage of processes corresponding to each display subcomponent. The bars may also vary in scale. The scale may be absolute such that the bars associated with every display subcomponent are the same scale. Alternatively, the scale may be adjusted to be relative to the size of the display subcomponent. The use of relative scales may prevent the bars from blocking a user's view of the display subcomponent. The bar displays may also be located in different corners or outside of the subcomponents. Further, the configuration, scales, locations, etc. may all be adjusted based upon user preferences.

In some aspects, a user may provide input responses to a bar resource utilization map in the same manner as described above with reference to FIGS. 2A and 2B. Alternatively, each bar in the resource utilization map 400 may include a cap displayed at its top. Such a cap may indicate a maximum utilization of the resource corresponding to the bar by the processes corresponding to the display subcomponent. In such an aspect, a user may adjust the caps, such as by dragging and dropping them to the desired limit, to provide input regarding the maximum resource utilization that the system should grant to the processes corresponding to the display subcomponents. By adjusting such caps, the user may limit or increase the maximum resources available to processes corresponding to each display subcomponent.

Like the resource utilization maps 200 and 210 described above with reference to FIGS. 2A and 2B, the resource utilization maps 300 and 400 may also be turned on and off by the user. Since a minimal amount of display area is occupied by the resource utilization maps 300, 400 illustrated in FIGS. 3 and 4, a user may choose to leave such resource utilization map turned on. In this manner, the user may be informed of changes in the resource utilization by underlying processes as the resource utilization map automatically updates over time.

Figure 5:
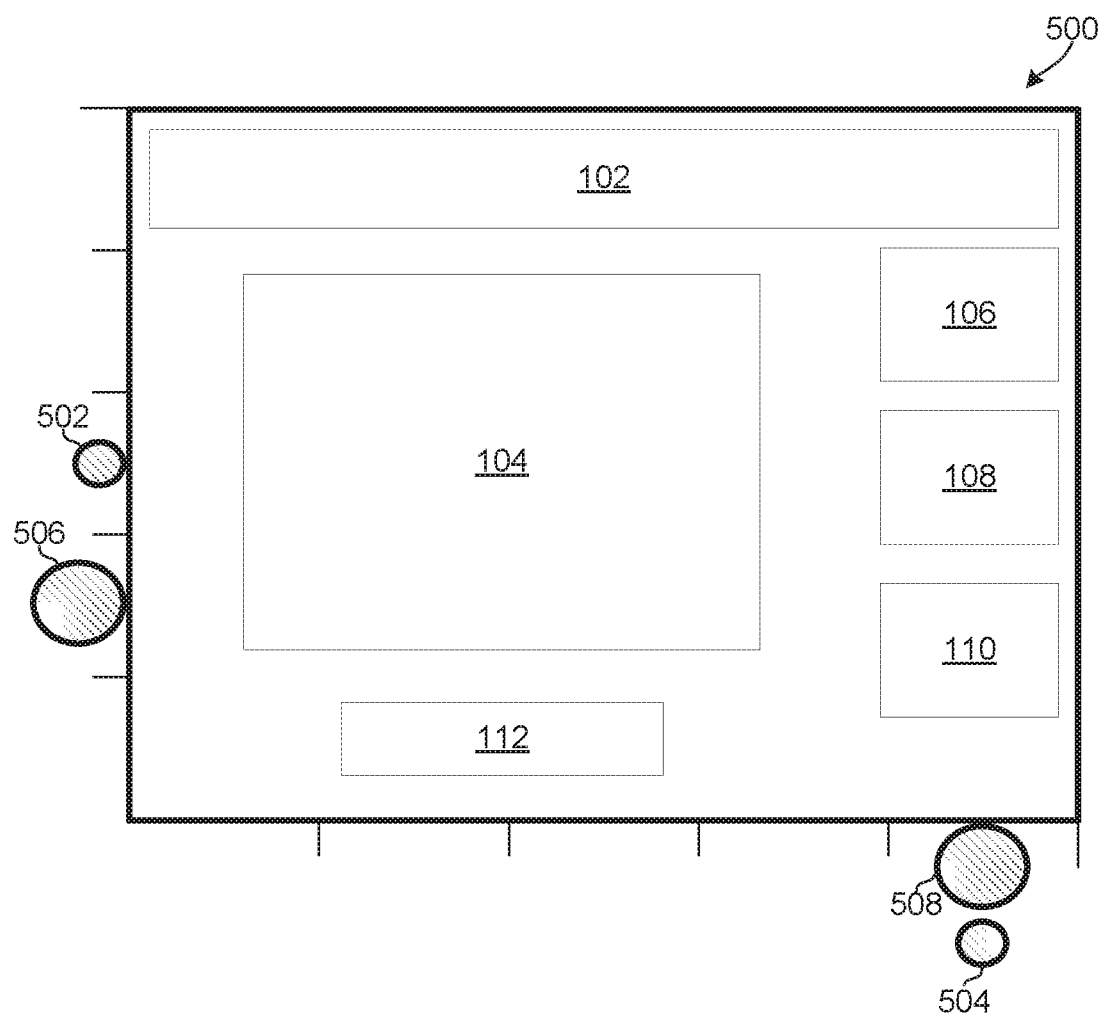
FIG. 5 is a diagram of the example application window showing a resource utilization map overlaid on the window revealing resource utilization in the form of markers on display axes to indicate coordinates of corresponding display elements.

FIG. 5 illustrates another form of resource utilization map 500, in which the resource utilization by processes corresponding to display subcomponents is indicated by markers presented on display boundaries. This aspect permits the user to view the display without distraction while being informed of the relative resource utilizations. In this aspect, the resource utilization markers may be arranged along one side and bottom (or top) of the display to indicate display coordinates of the display subcomponent. For example, heavy resource usage by processes corresponding to display subcomponent 108 is indicated in resource utilization map 500 by markers 502 and 504. Marker 502 indicates a Y coordinate, marker 504 indicates an X coordinate, and display subcomponent 108 is presented on the display at these X-Y coordinates. Different levels of resource usage could be indicated by differences in the markers, such as different shapes, colors, or sizes. For example, markers 506 and 508 are larger than markers 502 and 504 to indicate that processes corresponding to display subcomponent 110 are demanding a greater utilization of system resources than are the processes corresponding to display subcomponent 108. Differences in markers may also distinguish which markers correspond to which subcomponent. The aspect illustrated in FIG. 5 may offer advantages since the resource utilization markers do not block content presented on the display.

Figure 6:
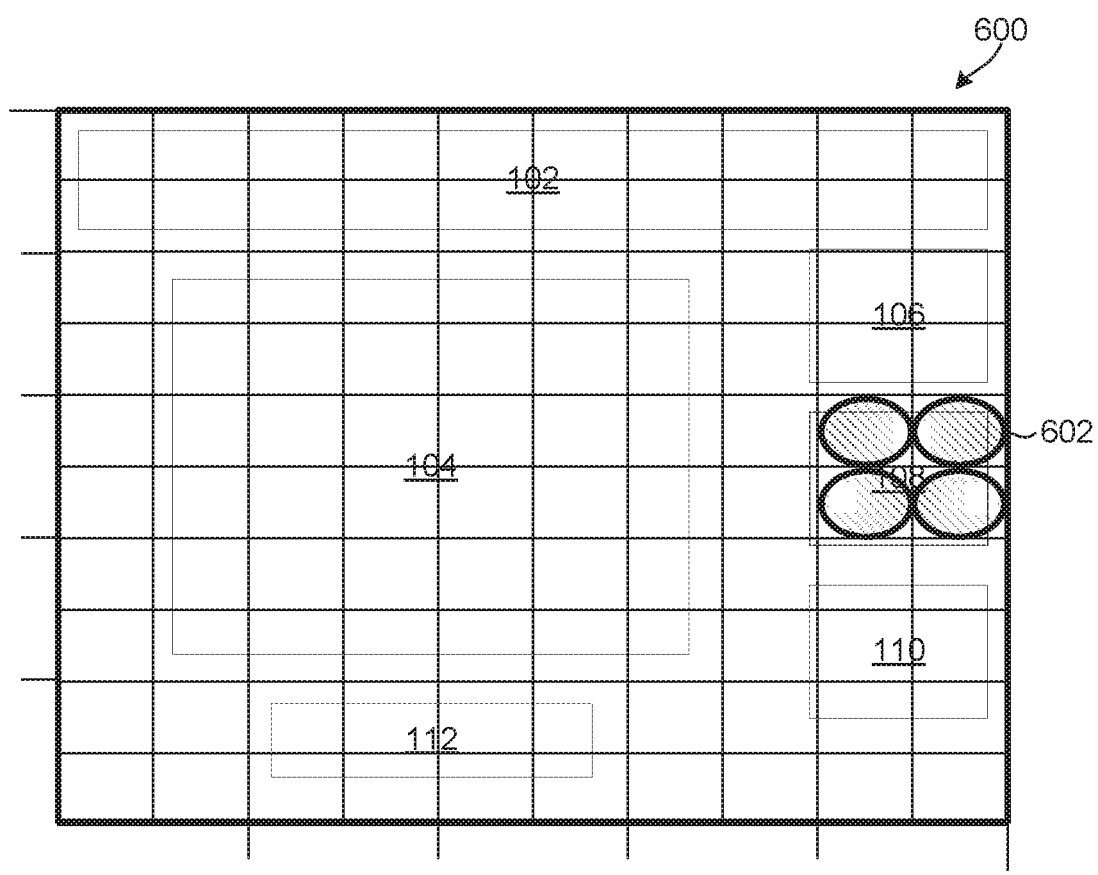
FIG. 6 is a diagram of the example application window showing a resource utilization map overlaid on the window revealing resource utilization in the form of a grid system.
Figure 7:
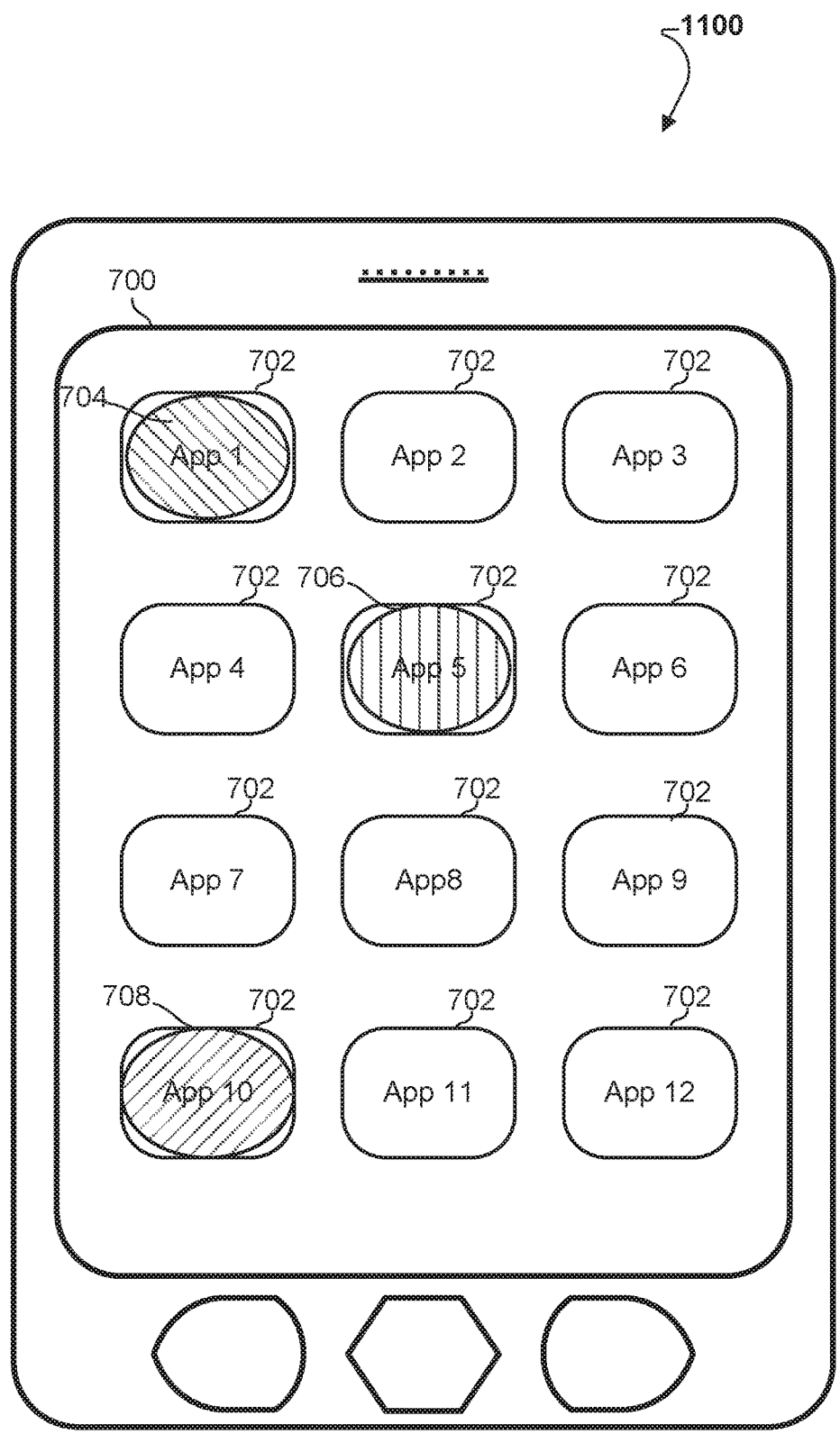
FIG. 7 is a diagram of the example application window showing a resource utilization map overlaid on the window revealing resource utilization in the form of a heat map overlaying a display of application icons.

FIG. 6 illustrates another aspect resource utilization map 600 featuring a grid overlay. In this aspect, areas of the grid overlay corresponding to applications or processes with heavy resource usage may be filled with shading portions 602. For example, the areas corresponding to subcomponent 108 are shaded in resource utilization map 600 to indicate greater resource usage. Portions 602 may vary in color or darkness similar to the heat map portions of resource utilization maps 200 and 210.

As mentioned above, resource utilization maps may also be employed with menus. FIG. 7 illustrates an exemplary resource utilization map 700 applied to a display of application icons 700. Each icon 702 may represent an application installed on the computing device 1100. The illustrated resource utilization map 700 includes shaded portions 704, 706, 708 to indicate applications using a resource or typically requiring a large amount of system resources. The resource utilization in the menu context may indicate the amount of memory occupied by a given application (software and associated data), the amount of system resources currently utilized (e.g., if the application is currently running), the amount of resources typically utilized when it is running, the amount of system resources that have been used over a preceding interval (e.g., battery consumption over the preceding 24 hours), etc. Also, different resource utilization maps may be generated to indicate each of these alternative resource utilization measures.

The resource utilization maps described above with reference to FIGS. 2A-7 show relative resource utilization by applications or process corresponding to display elements. However, not all active applications and processes may be associated with a visible display element. Applications and processes may be active in the background and competing for resources that a user desires to allocate to the application on which they are presently focused. For example, automatic application updates may activate while the user is viewing a video, thereby consuming communication bandwidth for downloading updates, while the user would rather see it dedicated to receiving the video data. As another example, periodic maintenance processing, such as virus scans, may run in the background and consume system resources even though there is no corresponding display element which may be identified with a resource utilization map as described above with reference to FIGS. 2A-7.

To accommodate such background processes, a resource utilization map may be generated to include an indication of background processes with no corresponding display element. For example, a resource utilization map may include an additional map or display with images representing each background process as illustrated in FIG. 8B. This additional map or display may be turned on and off by the user within the resource utilization map, or automatically turned on by the system when resources are fully utilized. This additional map may be colored, shaded, or otherwise marked similar to the resource utilization map. This aspect enables a user to be informed about the resource utilization by background processes and provide input regarding to privatization of resource usage even though there is no corresponding display element.

Figure 8A:
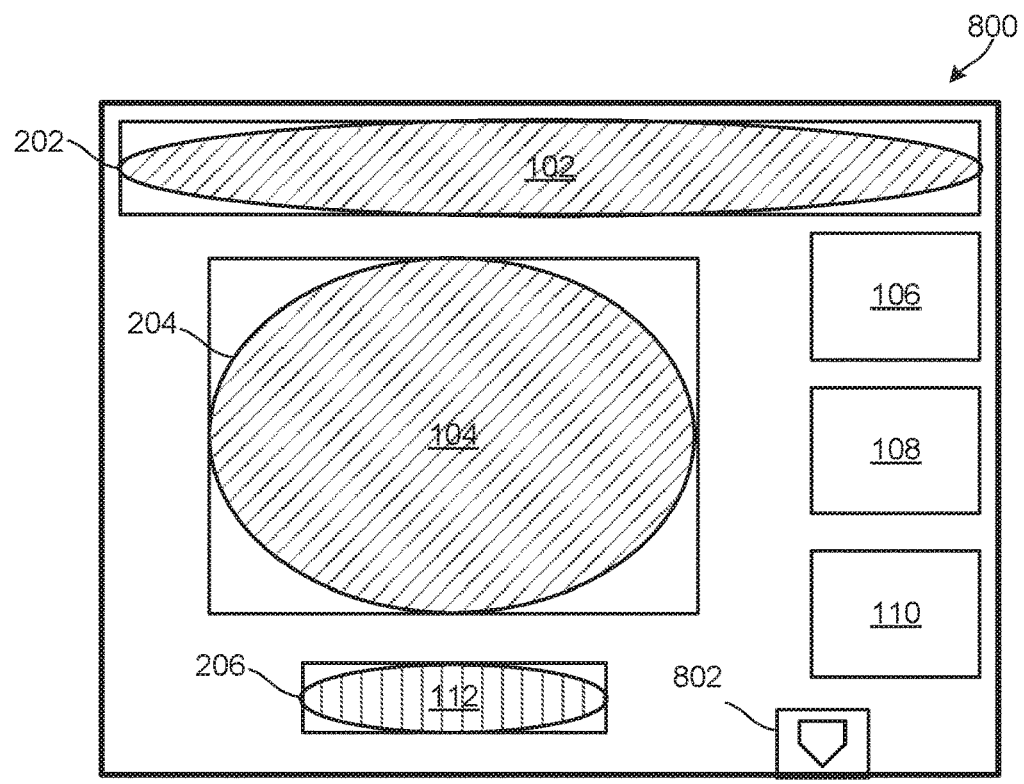
FIGS. 8A and 8B are diagrams of the example application window showing a resource utilization map overlaid on the window revealing resource utilization in the form of an additional chart displaying background processes that do not correspond to any display element.
Figure 8B:
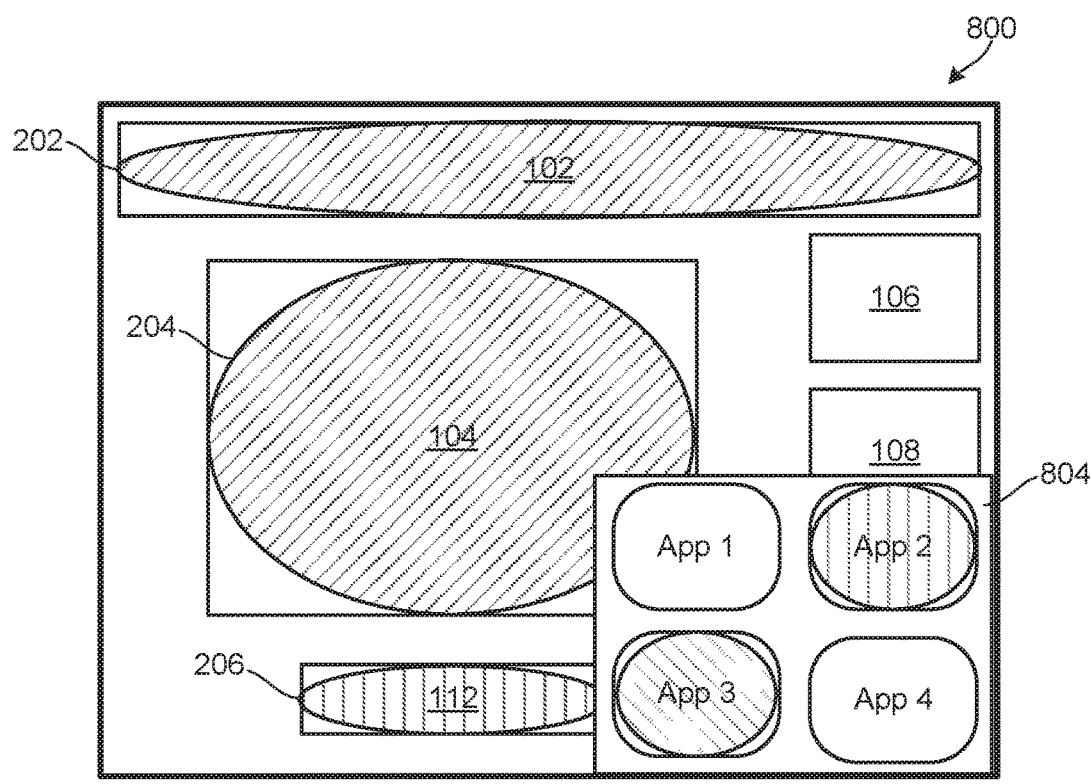

FIGS. 8A and 8B illustrate an aspect resource utilization map 800 including an additional map or display for background processes ("background map or display"). Similar to resource utilization map 200 described above with reference to FIG. 2A, the resource utilization map 800 illustrated in FIG. 8A includes shaded portions 202, 204, and 206 which indicate relative resource utilization by the processes corresponding to display subcomponents 102, 104, and 112. The resource utilization map 800 in this aspect also includes an indicator icon 802 which indicates that there are background processes not corresponding to display elements utilizing system resources. The indicator icon 802 may be presented in the resource utilization map display when background processes are also using resources to indicate that there is a background map or display the user may view. A user may elect to view the background map or display by any of a variety of user inputs, such as by clicking on the indicator icon 802 with a mouse, or touching the icon on a touch screen display. In response, the computing device may display the background map or display as illustrated in FIG. 8B. As illustrated in this figure, the background map 804 may display icons to represent otherwise invisible background processes, with resource utilization indications applied similar to indications on the rest of the resource utilization map 800. For example, background map 804 in FIG. 8B includes a heat map with shaded portions applied to background process icons. Like other parts of the resource utilization map 800, a user may select background processes for increased or decreased resource utilization by touching, clicking or otherwise selecting the icon or shaded portion. In response to such user input, the computing device may reallocate resources to or from background processes similar to processes associated with display elements.

A number of other illustrations may be used for resource utilization maps beyond the examples illustrated in the drawings. In an aspect, the utilization of multiple resources may be illustrated simultaneously by using resource utilization maps that feature multiple dimensions, the extra dimensions or elements being used to represent the multiple resources. One example of this aspect may be the presentation of "bubble map" resource utilization maps featuring bubbles that show communication latency as a color or intensity and communication bandwidth as the size of the bubble. As another example, the number of threads running concurrently may be represented by the size of the bubble while CPU utilization is represented by the color of the bubble. A third (or more) dimension for illustrating a third resource may be added to such bubble maps using color, shading or elevation.

Figure 9:
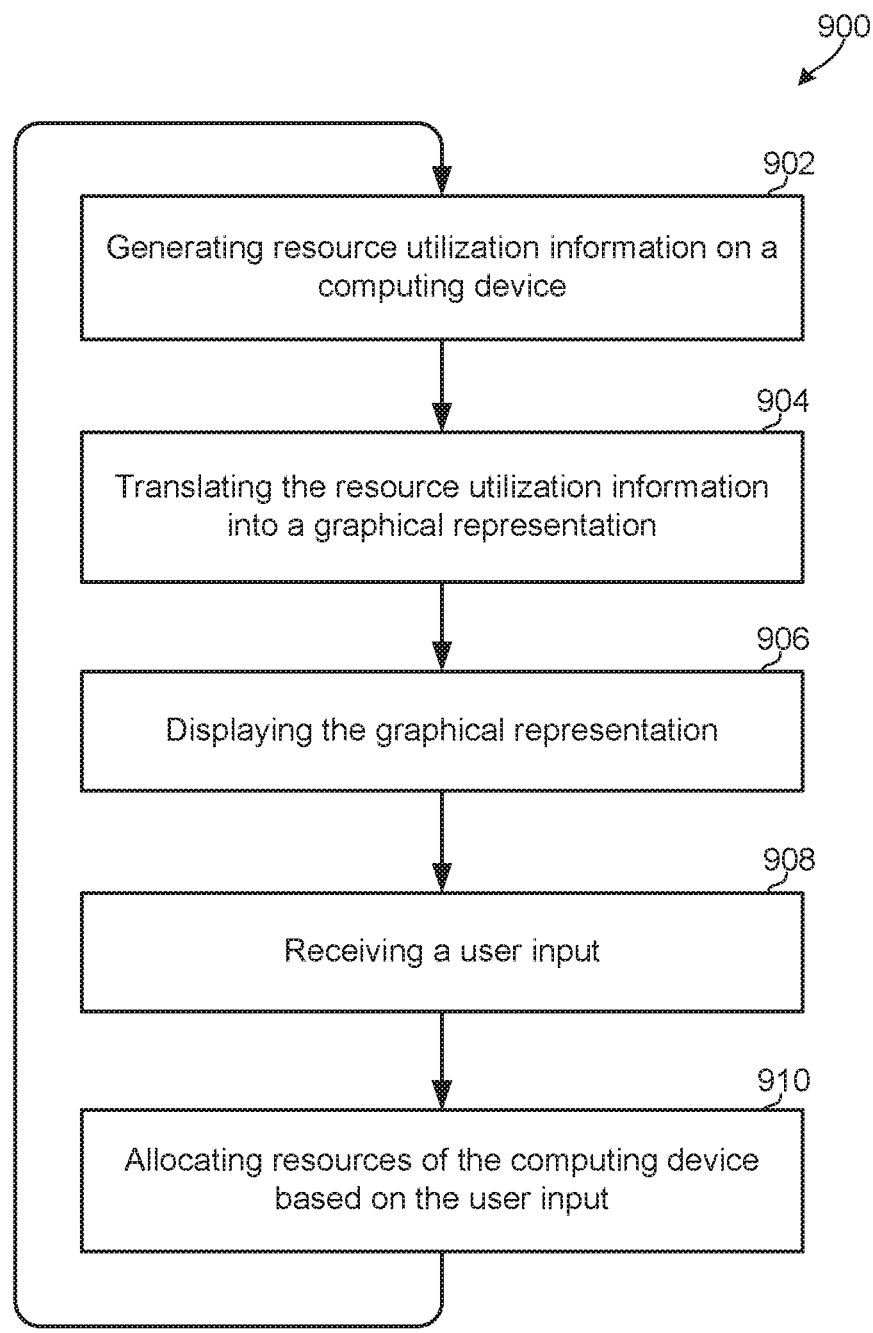
FIG. 9 is a process flow diagram of an aspect method for implementing a graphical representation of resource usage.

FIG. 9 illustrates an aspect method 900 for implementing a resource utilization map on the computing device. The key aspect method 900 may be implemented on a processor of a computing device by configuring the processor with executable instructions which perform each of the steps of the method. In method 900 and block 902, the processor may gather information regarding functions, processes, applications, components of processes, and components of applications utilizing various system resources. Typically operating systems maintain statistics regarding current resource utilization and can be configured to keep track of resource utilization over a period of time. For example, the processor may be configured to record the amount of processor computation time required by each process within a monitoring period, such as 10 seconds or a minute. As another example, the processor may determine the amount of memory space dedicated to a particular application of processor. A processor may determine communication bandwidth utilization by monitoring the amount of time signals are being transmitted and received in support of a particular application or process. The specific information obtained may vary depending on the type of resource utilization map to be generated. For example, to generate a resource utilization map related to memory usage, the processor may gather information regarding how much memory each active process is using or has used within a certain time period which may be defined by the type of resource utilization map.

In some cases, the information on resource usage may be available on the computing device, in which case the operations in block 902 may include a call for the appropriate information from memory or buffer maintained by the operating system. In other cases, the information available on resource utilization may require further manipulation to place it in suitable for use in the utilization map, such as calculating a time averaged utilization value.

In block 904, the processor may translate the obtained or generated resource utilization information into a graphical representation (i.e., resource utilization map) that corresponds to the display elements. This process of generating the resource utilization map may involve correlating applications and processes to particular display elements and totaling the resource utilization when more than one processes tied to a particular display element. This process also involves using the resource utilization information to generate the appropriate display overlay, such as an appropriately sized and colored overlay, appropriately sized and positioned bar graph, or appropriately raised or shadowed display elements. This translation of resource utilization information into graphical display elements may be repeated for each type of resource utilization map to be generated or supported by the computing device. To translate the information into graphical form, the active processes of the information may be associated with one or more display elements, such as a display subcomponent or icon. As discussed above, the graphical representation may include different visual indicators corresponding to display elements. These visual indicators may be varied, such as in color or shape, to correlate to the resource utilization information of the processes associated with the display element that the visual indicator corresponds to. For example, if the resource utilization information indicates a high memory use by a process, then the visual indicator corresponding to the process's associated display element may be shaded darkly or with a hot color (e.g., red or orange). For processes that are not associated with display elements, the obtained resource utilization information may be used to generate a background map that may be held in memory until selected for display by the user. In generating the resource utilization map, the various visual indicators of resource utilization may be aligned with their corresponding display elements. For example, a bright red visual indicator may overlay a display subcomponent whose associated processes are utilizing a significant amount of one or more system resources, such as processor time, memory storage, and/or communication bandwidth. In further aspects, the graphical representation may be integrated with the display such that the display and graphical representation may be adjusted, opened, or closed together.

In some aspects, a function or an application programming interface (API) may be provided to assist with overlaying or integrating the resource utilization map with an application. Such a function or API may receive data on the display and the display's elements or subcomponents from an application or operating system and return a resource utilization map display in which each visual indicator is properly aligned with a corresponding display element.

In cases where there are background processes utilizing system resources and a background map is generated, the generated resource utilization map may also include an icon to alert the user to the availability of the background map.

In block 906, the generated resource utilization map may be displayed. Display may involve overlaying the graphical representation over current display. Mechanisms for generating display and generating overlay displays are well known in the computing arts.

In block 908 the processor may receive a user input via a user interface. The user input may indicate a selection of a display element in response to a displayed graphical representation of resource usage. This input may be in any form compatible with the computing device user interfaces, such as input from a button press on a keyboard or mouse, a verbal input received from a microphone, a touch event received by a touch screen, or other user input sensor. For example, a user may click on a visual indicator of a resource utilization map or push a key corresponding to an icon.

In block 910, the processor may use the received user inputs to reallocate system resources. The resources reallocated by the processor may be the same resources as indicated in the displayed resource utilization map. For example, if a resource utilization map based on memory usage is presented, then memory may be the resource reallocated based on the user input. The manner in which resources may be reallocated will depend upon the type of resource, the applications and processes using the resource, system permissions, and the operating state of the computing device. Also, the process of reallocating system resources may allocate more resources to a selected process or application, or reduce or eliminate resource accessed by processes or applications selected by the user. The reallocation of system resources may be accomplished via the operating system, such as by a scheduler components, or by deactivating selected applications or processes. In some aspects, the computing device processor may have a scheduler responsible for managing access to resources by processes. The scheduler may rely on different scheduling algorithms that can accommodate user preferences for selected processes. In other aspects, resource managing software that is part of the computing device's operating system may be used to reallocate resources to selected processes.

The operations of method 900 may continue so long as the resource utilization map process remains active. Thus, the computing device may return to block 902 to gather current resource utilization data after implementing user preferences in block 910. In this manner users may continue to fine tune resource allocations until they are satisfied with their computing device performance.

Figure 10A:
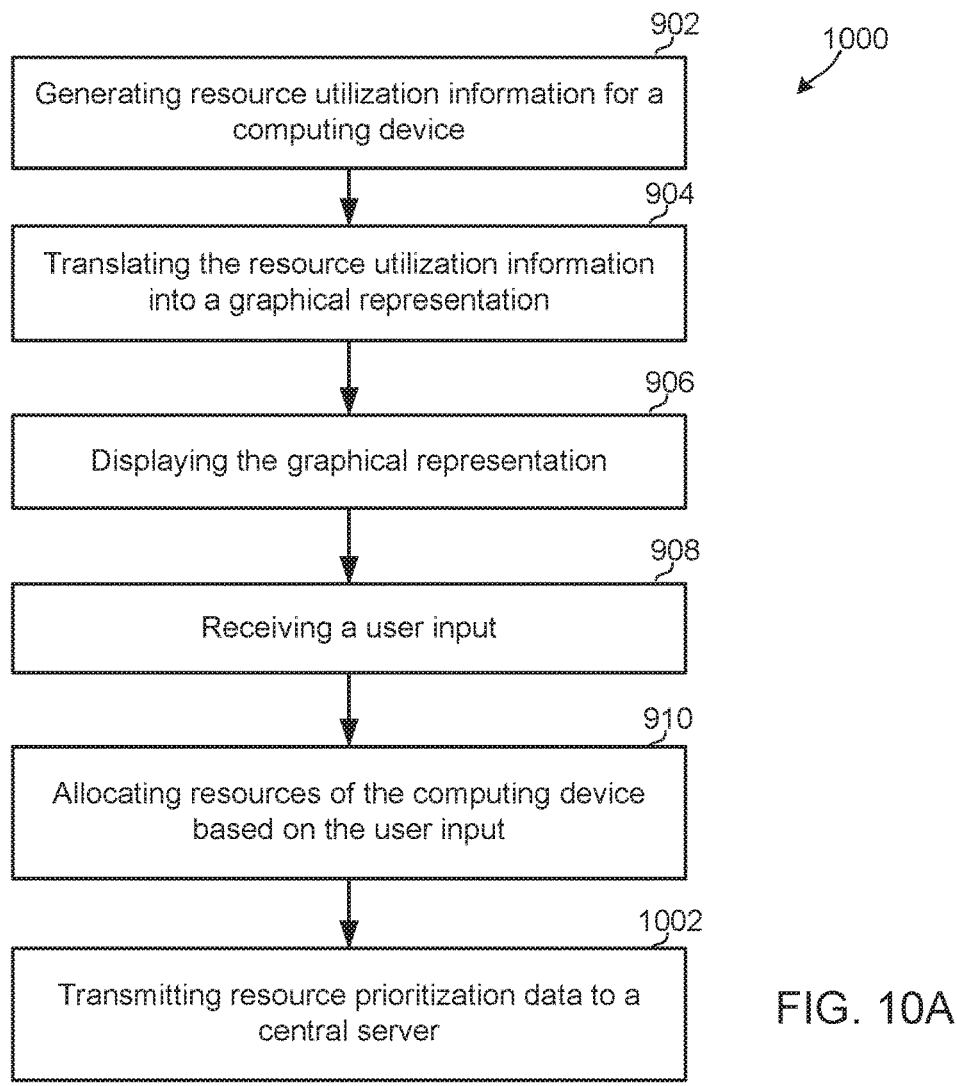
FIG. 10A is a process flow diagram of an aspect method for implementing a graphical representation of resource usage.
Figure 10B:
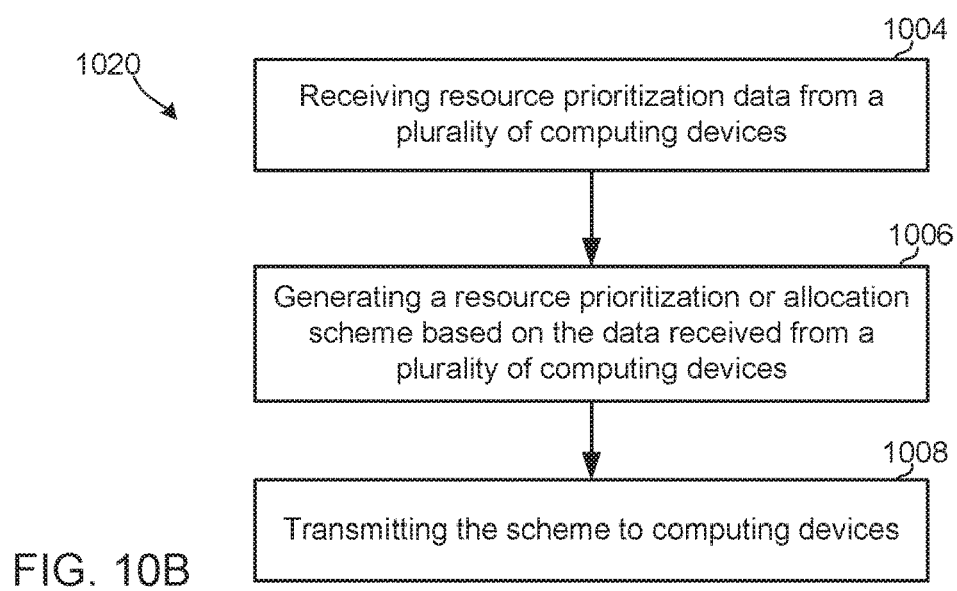
FIG. 10B is a process flow diagram for centrally compiling user responses to a graphical representations on multiple computing devices.
Figure 10C:
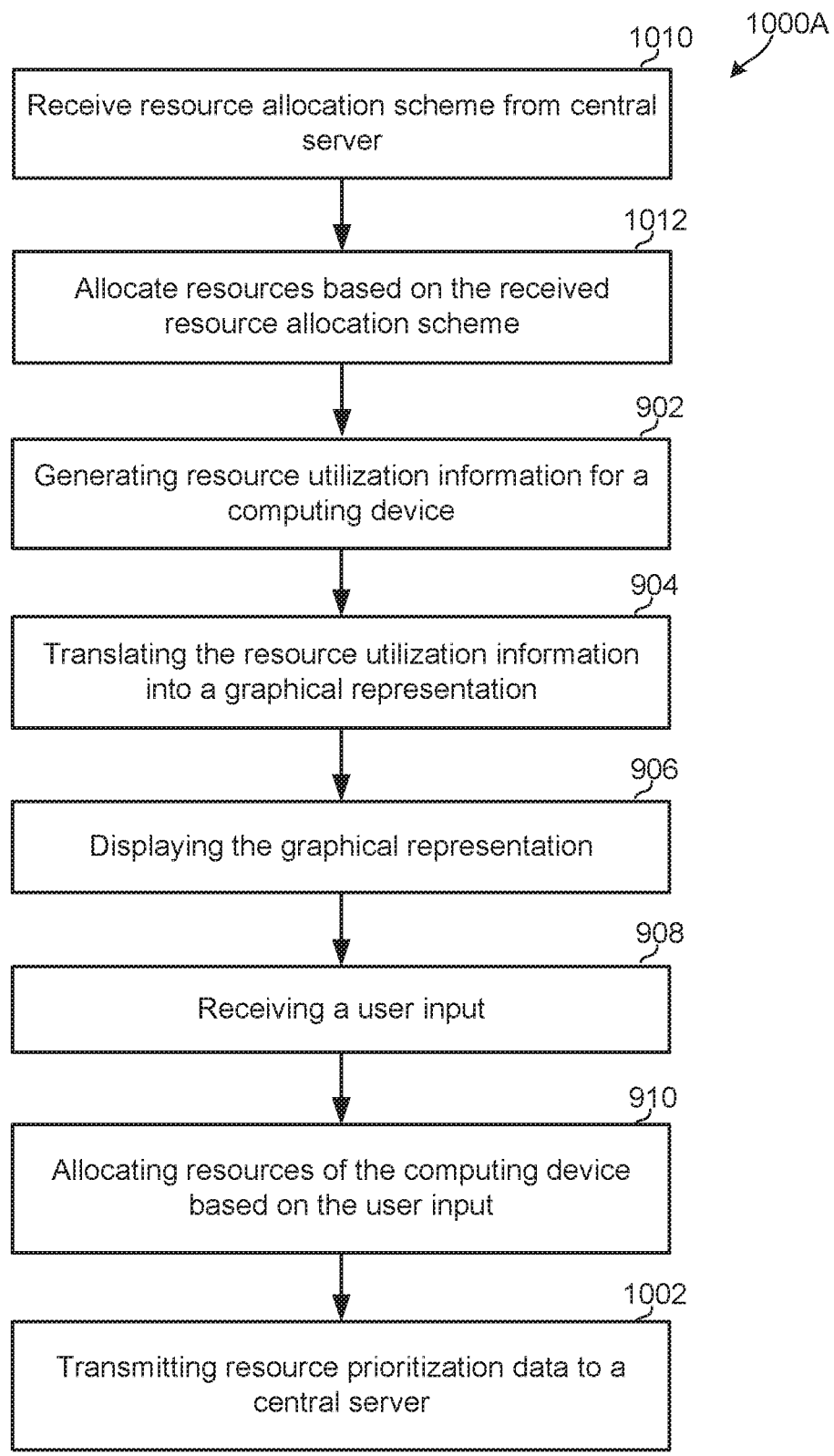
FIG. 10C is a process flow diagram of an aspect method for implementing a graphical representation of resource usage and utilize information provided from centrally compiling user responses to graphical representations on multiple computing devices.

As mentioned above, in an aspect, user inputs regarding application or process priorities may be transmitted to a central server for use in developing community-based system resource allocation schemes. FIG. 10A illustrates an aspect method 1000 for implementing a resource utilization map on a computing device that relays data on resource allocations or priorities to a central server. FIG. 10B illustrates an aspect method 1020 that may be implemented on a central server using the resource prioritization data relayed by one or more computing devices to develop a community based resource allocation scheme. FIG. 10C illustrates an aspect method 1000A for utilizing a community based resource allocation scheme on a computing device to set an initial resource allocation that may be altered by user interacting with the resource utilization map.

Referring to FIG. 10A, method 1000 includes the operations of method 900 described above with the additional operation in block 1002 of transmitting resource prioritization data to a central server. In method 1000, blocks 902, 904, 906, 908, and 910 may be performed in the same manner as described above with reference to FIG. 9. In block 1002, the computing device processor may transmit to a central server the resource prioritization data resulting from received user inputs or the implementation of user inputs regarding computing device resource allocations. This data may include priorities or resource allocations set by the computing device based on user inputs. The transmission of such resource allocation data may be accomplished via any available telecommunication mechanism, including wireless data communication links in the case of mobile devices.

As mentioned above, a central server may gather resource allocation information reflecting the decisions of many users, and use that information to generate a resource prioritization or allocation scheme reflective of community prioritization decisions (i.e., a community resource prioritization scheme). The generation and dissemination of community resource prioritization schemes may be particularly useful for operating conditions that will be common to many computing devices. An example of such a common operating condition is the presentation of a popular Internet website. For example, hundreds of thousands of users will check popular news sites, such as CNN.com, New York Times.com, etc., as well as popular service websites, such as Facebook.com, YouTube.com, etc. Typically, website owners include a large amount of different content that is displayed on the same webpage, including advertising, links, etc. By developing a community resource prioritization scheme for a particular webpage based on resource allocation data received from a plurality of computing devices, a central server can determine a resource prioritization scheme that is common to a majority (or at least a large fraction) of users. Since such a community resource prioritization scheme is going to be applicable to a large number of users accessing a particular website, for example, this scheme may be useful to enable computing devices accessing the page to present its contents with a predefined resource allocation reflective of community preferences. In this manner, the computing device can prioritize resources using a prioritization scheme that will be suitable for a large number of users before the user has an opportunity to make his or her own adjustments. By gathering user resource allocation data and dynamically updating the community resource prioritization scheme for particular websites or webpages, such a central server can provide recommended resource prioritization schemes that reflect the current webpage content as well as average user activities. For example, a news page website will change throughout the day as the news evolves, and thus the user resource prioritization decisions will change depending upon the hot story of the moment. Also, user resource prioritizations may change throughout the day for a given website, such as to emphasize real-time traffic updates around commuting times, while deemphasizing such telecommunication-resource-intensive processes at other times.

Referring to FIG. 10B, in method 1020, a central server may receive resource prioritization data from a plurality of computing devices in block 1004. This data may include the same data transmitted by a computing device in block 1002 but from any number of devices. Reception of the resource prioritization data may be via any available communication link that may be accessed by computing devices, such as the Internet, local networks, and wireless data networks. Using the received data, the server or another system in communication with the server may generate a community resource prioritization scheme in block 1006. In block 1006, a community resource prioritization scheme may be generated for each type of resource, as well as for each application, website, and display for which resource allocation data is received from computing devices.

A community resource prioritization scheme may be generated by a central server using a variety of methods. In a first aspect method, a community resource prioritization scheme may be generated as an average of the resource priorities collected from all the reporting computing devices. In a second aspect method, priorities from reporting computing devices may be weighted according to a variety of criteria, such as computing devices that have been identified as community thought leaders (e.g., individuals whose preferences appear to reflect those of the majority of users). In a third aspect method, the community resource allocation scheme may be configured to reflect relative allocations, such as comparisons between resources. For example, if the allocation data pertained to user selections based on a resource utilization map overlaid on a web page, the community resource allocation scheme may include a ranking of resource allocations to particular displayed webpage subcomponents. In a fourth aspect method, a central server may determine resource allocations that are common to a plurality or majority of users, and adopt that as the community resource allocation scheme. In a fifth aspect method, computing devices known to be members of particular user groups may be used to generate community resource allocation schemes for those particular user groups, thereby providing a variety of community resource allocation schemes suitable for each of the recognized user groups.

In block 1008 of method 1020, generated community resource allocation scheme may be transmitted to computing devices via any available communication link, such as the Internet, a closed network, or a wireless data communication network. This transmission of the community resource allocation scheme may be broadcast to all subscribing computing devices, or may be transmitted only to those computing devices that reported resource allocation settings to the central server. In an aspect, the transmission of community resource allocation schemes may be a service to which users can subscribe, such as by opting into the service or by paying a subscription fee.

Computing devices that receive a community resource allocation scheme may rely on the scheme to allocate or prioritize resources, such as upon launching a website before a user has an opportunity to input preferences. For example, if the community resource allocation scheme included data on resource allocations for a popular web page, the computing device may initially rely on the scheme for resource allocations when loading the web page. Resources may later be reallocated based on user inputs in response to a resource utilization map as described above. In further aspects, applications or processes with low resource priorities in a community resource allocation scheme may be blocked or deactivated, at least until the user selects the corresponding display elements for activation.

FIG. 10C illustrates an example method 1000B that may be implemented in computing devices in order to utilize such community resource allocation schemes transmitted by a central server. In method 1000B in block 1010, a computing device may receive a community resource allocation scheme transmitted by a central server. As mentioned above, this reception of the community resource allocation scheme may be via any available communication link between the computing device and the central server. In block 1012, the computing device processor may implement or use the resource prioritization data within the received scheme to allocate resources to applications or processes. The reallocation of system resources may be accomplished in a manner similar to how resources may be allocated in response to user inputs described above. Thereafter, the computing device may generate a resource utilization map and receive user inputs via performing operations 902-910 as described above with reference to FIG. 9.

Figure 11:
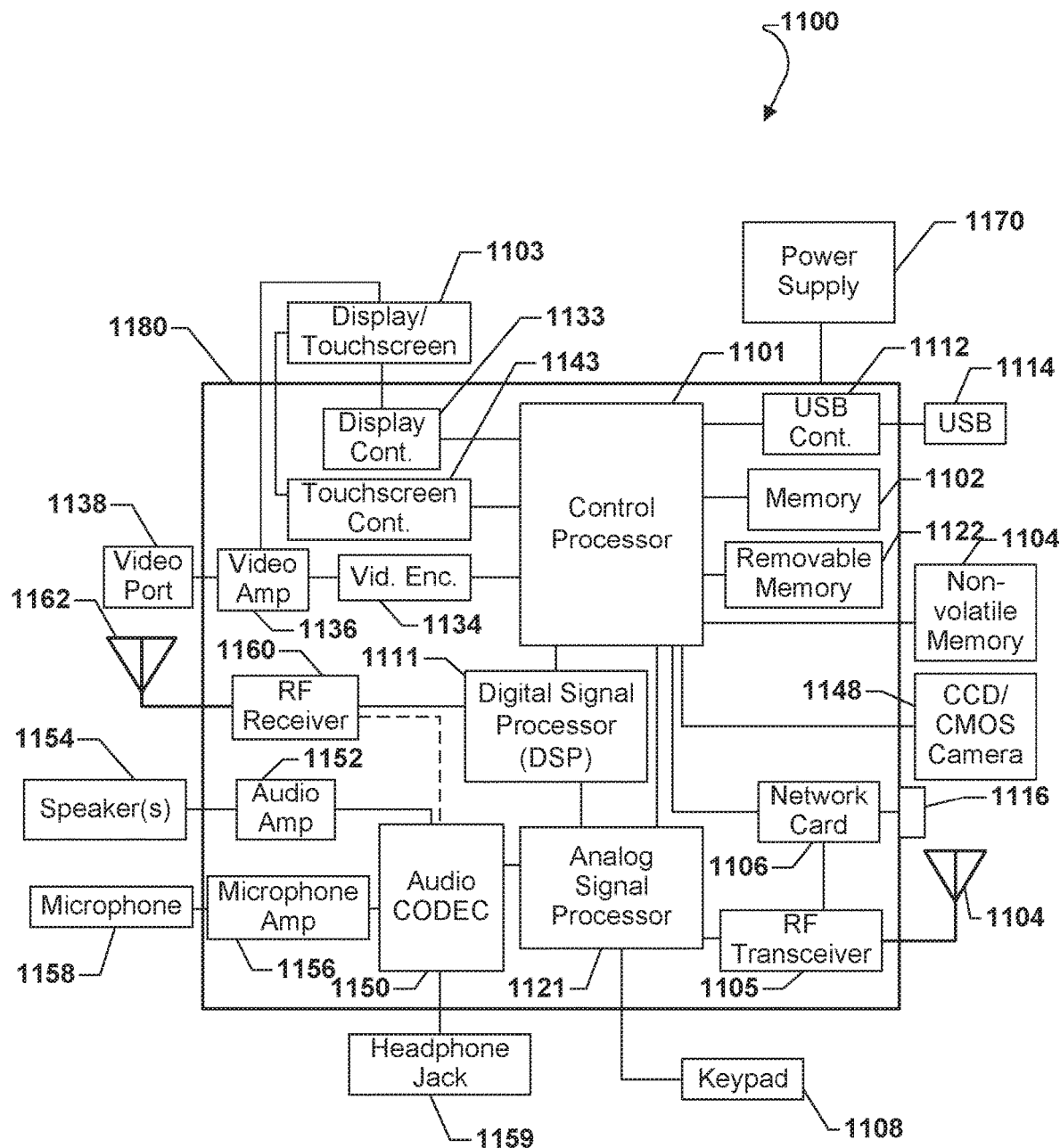
FIG. 11 is a cutaway view of a computing device suitable for use with the various aspects.

The aspects described above may be implemented on any of a variety of computing devices, such as mobile computing devices and notebook computers. Example components and modules of an exemplary, non-limiting aspect of such a computing device 1100 are illustrated in FIG. 11. A computing device 1100 may include circuit board 1180 of electronic components, some or all of which may be integrated into an on-chip system, that includes a control processor 1101 coupled to memory 1102. While a single processor 1101 is shown in FIG. 11, the various aspects may also be implemented in multi-processor devices, such as when the control processor 1101 is a multi-core processor or with multiple processors packaged in separate chips similar in shape and connections to the control processor 1101. The control processor 1101 may further be coupled to a digital signal processor 1111 and/or an analog signal processor 1121, which also be coupled together. In some aspects, the control processor 1101 and a digital signal processor 1111 may be the same component or may be integrated into the same processor chip. A display controller 1133 and a touchscreen controller 1143 may be coupled to the control processor 1101 and to display or touchscreen display 1103 within or connected to the computing device 1100.

The control processor 1101 may also be coupled to removable memory 1122 (e.g., an SD memory or SIM card in the case of mobile computing devices) and/or to external memory 1104, such as one or more of a disk drive, CD drive, and a DVD drive. The control processor 1101 may also be coupled to a Universal Serial Bus (USB) controller 1112 which couples to a USB port 1114. Also, a power supply 1170 may be coupled to the circuit board 1180 through the USB controller 1112 or through different electrical connections to provide power (e.g., DC power) to the various electronic components.

The control processor 1101 may also be coupled to a video encoder 1134, e.g., a phase alternating line (PAL) encoder, a sequential couleur a memoire (SECAM) encoder, or a national television system(s) committee (NTSC) encoder. Further, the video encoder 1134 may be coupled to a video amplifier 1136 which may be coupled to the video encoder 1134 and the display or touchscreen display 1103. Also, a video port 1138 may be coupled to the video amplifier 1136 to enable connecting the computing device 1100 to an external monitor, television or other display (not shown).

In some aspects, particularly mobile computing devices, the control processor 1101 may be coupled to a radio frequency (RF) transceiver 1105, such as via an analog signal processor 1121. The RF transceiver 1105 may be coupled to an RF antenna 1104 for transmitting and receiving RF signals. The RF transceiver 1105 may be configured to transmit and receive communication signals of one or more different wireless communication protocols including, for example, cellular telephone (e.g., G-3, UMTS, CDMA, etc.), WiFi, WiMax, and BlueTooth.

The control processor 1101 may further be coupled to a network card 1106 which may be coupled to a network connector 1116 and/or the RF transceiver 1105 and configured to enable communications via an external network (e.g., local area networks, the Internet, an intranet, WiFi networks, BlueTooth networks, personal area network (PAN) etc.) The network card 1106 may be in the form of a separate chip or card, or may be implemented as part of the control processor 1101 or the RF transceiver 1105 (or both) as a full solution communication chip.

A number of analog devices may be coupled to the control processor 1101 via the analog signal processor 1121, such as a keypad 1108 as shown in FIG. 11. In other implementations, a keypad or keyboard may include its own processor so that the interface with the control processor 1101 may be via direct connection (not shown), via a network connection (e.g., via the network card), or via the USB port 1114.

In some implementations, a digital camera 1148 may be coupled to the control processor 1101. In an exemplary aspect, the digital camera 1148 may be a charge-coupled device (CCD) camera or a complementary metal-oxide semiconductor (CMOS) camera. The digital camera 1148 may be built into the computing device 1100 or coupled to the device by an external cable.

In some implementations, an audio CODEC 1150 (e.g., a stereo CODEC) may be coupled to the analog signal processor 1121 and configured to send sound signals to one or more speakers 1154 via an audio amplifier 1152. The audio CODEC 1150 may also be coupled to a microphone amplifier 1156 which may be coupled to a microphone 1158 (e.g., via a microphone jack). A headphone jack 1159 may also be coupled to the audio CODEC 1150 for outputting audio to headphones.

In some implementations, the computing device 1100 may include a separate RF receiver circuit 1160 which may be coupled to an antenna 1162 for receiving broadcast wireless communication signals. The receiver circuit 1160 may be configured to receive broadcast television signals (e.g., FLO TV broadcasts), and provide received signals to the DSP 1111 for processing. In some implementations, the receiver circuit 1160 may be configured to receive FM radio signals, in which case the received signals may be passed to the Audio CODEC 1150 for processing.

In an aspect, processor-executable instructions for accomplishing one or more of the method operations described above may be stored in the internal memory 1102, removable memory 1122 and/or non-volatile memory 1104 (e.g., as on a hard drive, CD drive, or other storage accessible via a network). Such processor-executable instructions may be executed by the control processor 1101 in order to perform the methods described herein.

Figure 12:
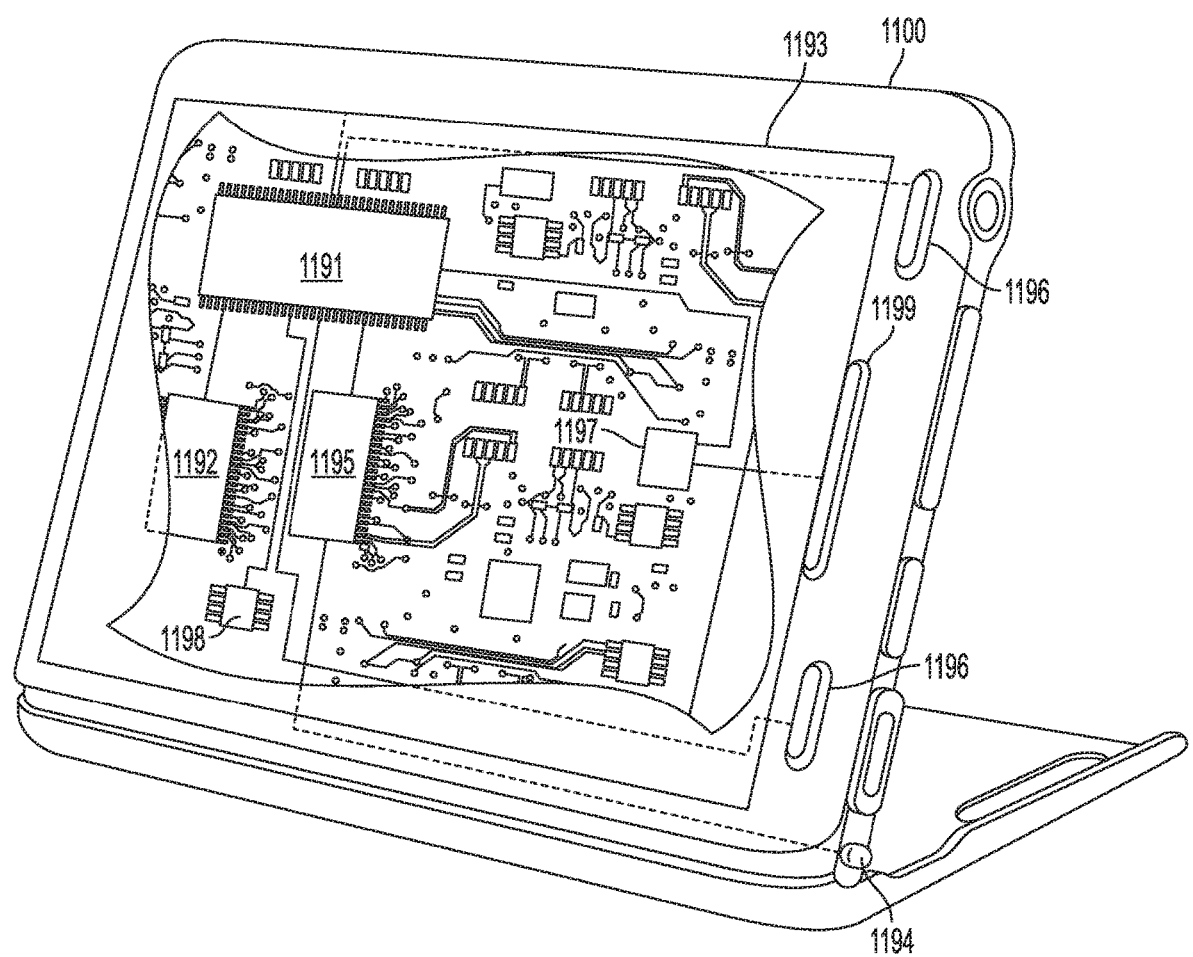
FIG. 12 is an illustration of an example portable computing device suitable for use with the various aspects.
Figure 13:
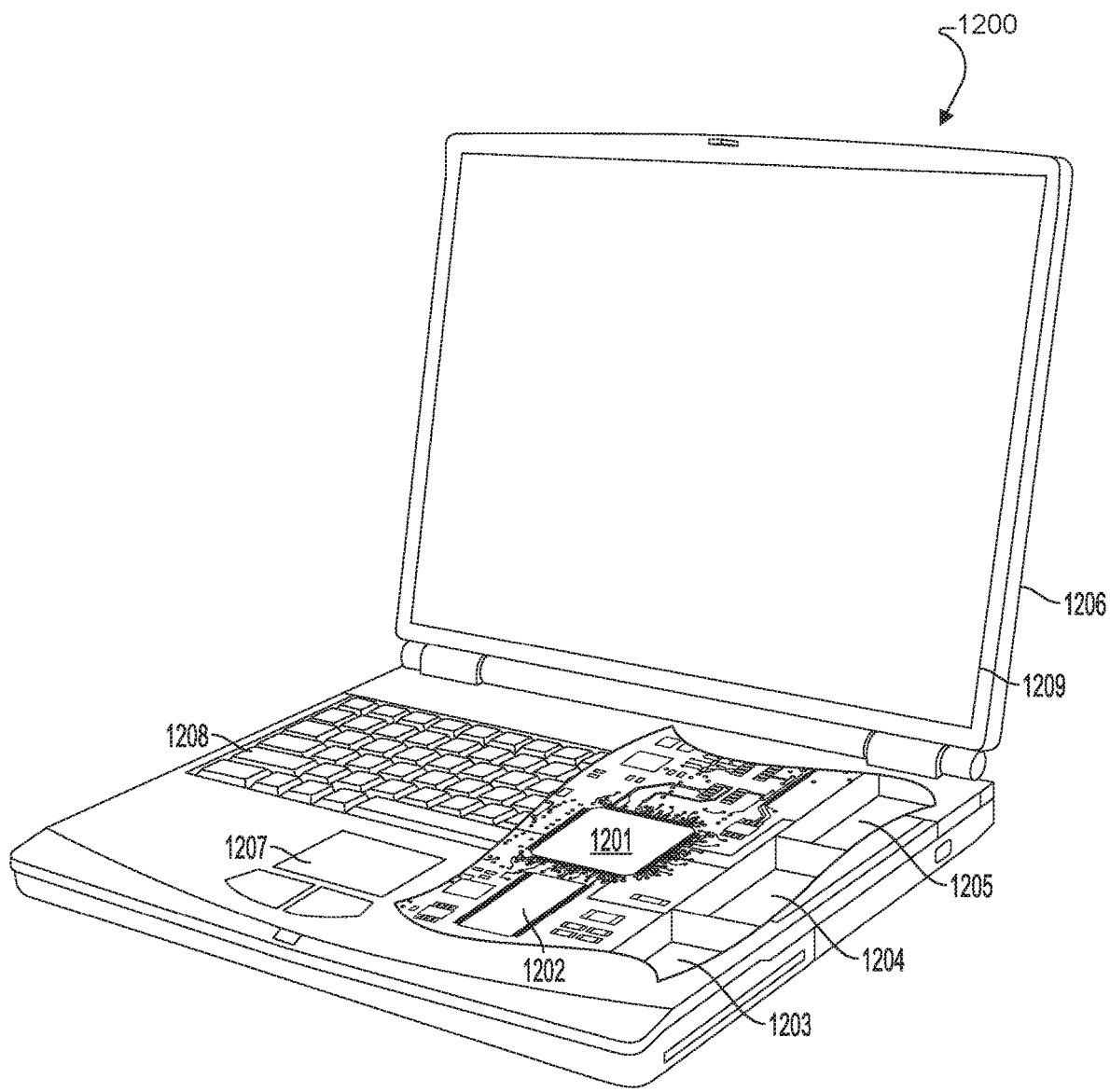
FIG. 13 is an illustration of an example personal computer suitable for use with the various aspects.

An example of a mobile computing device is illustrated in FIG. 12, and an example of a notebook computer is illustrated in FIG. 13. Typical mobile computing devices 1200 will have in common the components illustrated in FIG. 12. For example, mobile computing devices 1100 may include a processor 1191 coupled to internal memory 1192 and a touch surface input device/display 1193. The touchscreen display 1193 may be a resistive-sensing touchscreen, capacitive-sensing touchscreen, infrared sensing touchscreen, acoustic/piezoelectric sensing touchscreen, or the like. The various aspects are not limited to any particular type of touchscreen display 1193 or touchpad technology. Additionally, the computing device 1100 may have an antenna 1194 for sending and receiving electromagnetic radiation that is connected to a wireless data link and/or cellular telephone transceiver 1195 coupled to the processor 1191. Computing devices 1100 may also include physical buttons 1196 for receiving user inputs. The processor 1191 may further be connected to a wired network interface 1198, such as a universal serial bus (USB) or FireWire® connector socket, for connecting the processor 1191 to an external touchpad or touch surface on which the various aspects may also be applied.

In some implementations, a touch surface can be provided in areas of the electronic device 1100 outside of the touchscreen display 1193. For example, a keypad (not shown) may include a touch surface with buried capacitive touch sensors. In other implementations, the touchscreen display 1193 may provide the complete GUI.

The aspects described above may also be implemented within a variety of computing devices, such as a laptop computer 1200 as illustrated in FIG. 13. Many laptop computers include a touch pad touch surface that serves as the computer's pointing device, and thus may receive drag, scroll, and flick gestures similar to those implemented on mobile computing devices equipped with a touchscreen display. A laptop computer 1200 will typically include a processor 1201 coupled to volatile memory 1202 and a large capacity nonvolatile memory, such as a disk drive 1203. The computer 1200 may also include a floppy disc drive 1204 and a compact disc (CD) drive 1205 coupled to the processor 1201. The computer device 1200 may also include a number of connector ports coupled to the processor 1201 for establishing data connections or receiving external memory devices, such as a USB or FireWire connector sockets, or other network connection circuits 1206 for coupling the processor 1201 to a network. In a notebook configuration, the computer housing includes the touchpad 1207, keyboard 1208, and the display 1209 all coupled to the processor 1201. Other configurations of computing device may include a computer mouse or trackball coupled to the processor (e.g., via a USB input) as are well known.

The computing device processor 1191, 1201 may be any programmable microprocessor, microcomputer or multiple processor chip or chips that can be configured by software instructions (applications) to perform a variety of functions, including the functions of the various aspects described above. In some portable computing devices 1100, multiple processors 1191 may be provided, such as one processor dedicated to wireless communication functions and one processor dedicated to running other applications. The processor may also be included as part of a communication chipset.

The foregoing method descriptions and the process flow diagrams are provided merely as illustrative examples, and are not intended to require or imply that the operations or steps of the various aspects must be performed in the order presented. As will be appreciated by one of skill in the art the order of operations or steps in the foregoing aspects may be performed in any order. Words such as "thereafter," "then," "next," etc. are not intended to limit the order of the operations or steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, operations, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, hut, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or steps may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such a non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A resource optimization method executed on a central server comprising:
   receiving, from a plurality of computing devices, resource allocation data that includes one or more resource allocation priorities made in each of the plurality of computing devices in response to user inputs received in each of the plurality of computing devices, wherein the user inputs are received in response to a displayed graphical representation including one or more visual indicators illustrating usage of a resource;
   generating a community resource allocation scheme based on the received resource allocation data; and
   transmitting the community resource allocation scheme to specified computing devices of the plurality of computing devices.

2. The resource optimization method of claim 1, wherein the received resource allocation data further includes user preferences.

3. The resource optimization method of claim 1, wherein the received resource allocation data includes user inputs received on each of the plurality of computing devices in response to a displayed resource utilization map configured to inform a computing device user through the one or more visual indicators about relative amounts of system resources used by functions, applications, processes, components of processes, and components of applications running on the respective computing device.

4. The resource optimization method of claim 1, wherein the received resource allocation data further includes a resource permission set in each of the plurality of computing devices in response to a displayed resource utilization map.

5. The resource optimization method of claim 1, wherein the specified computing devices of the plurality of computing devices include all subscribing computing devices.

6. The resource optimization method of claim 1, wherein the specified computing devices of the plurality of computing devices include all computing devices that reported the resource allocation data to the central server.

7. A server, comprising:
   a network connection configured to receive transmissions from and send transmissions to a plurality of computing devices; and
   a server processor configured with processor-executable instructions to perform operations comprising:
      receiving, from the plurality of computing devices, resource allocation data that includes one or more resource allocation priorities made in each of the plurality of computing devices in response to user inputs received in each of the plurality of computing devices, wherein the user inputs are received in response to a displayed graphical representation including one or more visual indicators illustrating usage of a resource;
      generating a community resource allocation scheme based on the received resource allocation data; and
      transmitting the community resource allocation scheme via the network connection to specified computing devices of the plurality of computing devices.

8. The server of claim 7, wherein the received resource allocation data further includes user preferences.

9. The server of claim 7, wherein the received resource allocation data includes user inputs received on each of the plurality of computing devices in response to a displayed resource utilization map configured to inform a computing device user through the one or more visual indicators about relative amounts of system resources used by functions, applications, processes, components of processes, and components of applications running on the respective computing device.

10. The server of claim 7, wherein the received resource allocation data further includes a resource permission set in each of the plurality of computing devices in response to a displayed resource utilization map.

11. The server of claim 7, wherein the specified computing devices of the plurality of computing devices include all subscribing computing devices.

12. The server of claim 7, wherein the specified computing devices of the plurality of computing devices include all computing devices that reported the resource allocation data to the server.

13. A server, comprising:
   means for receiving transmissions from and sending transmissions to a plurality of computing devices;
   means for receiving from the plurality of computing devices resource allocation data that includes one or more resource allocation priorities made in each of the plurality of computing devices in response to user inputs received in each of the plurality of computing devices, wherein the user inputs are received in response to a displayed graphical representation including one or more visual indicators illustrating usage of a resource;
   means for generating a community resource allocation scheme based on the received resource allocation data; and
   means for transmitting the community resource allocation scheme via a network connection to specified computing devices of the plurality of computing devices.

14. The server of claim 13, wherein the received resource allocation data further includes user preferences.

15. The server of claim 13, wherein the received resource allocation data includes user inputs received on each of the plurality of computing devices in response to a displayed resource utilization map configured to inform a computing device user through the one or more visual indicators about relative amounts of system resources used by functions, applications, processes, components of processes, and components of applications running on the respective computing device.

16. The server of claim 13, wherein the received resource allocation data further includes a resource permission set in each of the plurality of computing devices in response to a displayed resource utilization map.

17. The server of claim 13, wherein the specified computing devices of the plurality of computing devices include all subscribing computing devices.

18. The server of claim 13, wherein the specified computing devices of the plurality of computing devices include all computing devices that reported the resource allocation data to the server.

19. A non-transitory computing readable storage medium having stored thereon processor-executable instructions configured to cause a server to perform operations comprising:
   receiving, from a plurality of computing devices, resource allocation data that includes one or more resource allocation priorities made in each of the plurality of computing devices in response to user inputs received in each of the plurality of computing devices, wherein the user inputs are received in response to a displayed graphical representation including one or more visual indicators illustrating usage of a resource;

generating a community resource allocation scheme based on the received resource allocation data; and transmitting the community resource allocation scheme to specified computing devices of the plurality of computing devices.

20. The non-transitory computing readable storage medium of claim 19, wherein the received resource allocation data further includes user preferences.

21. The non-transitory computing readable storage medium of claim 19, wherein the received resource allocation data includes user inputs received in each of the plurality of computing devices in response to a displayed resource utilization map configured to inform a computing device user through the one or more visual indicators about relative amounts of system resources used by functions, applications, processes, components of processes, and components of applications running on the respective computing device.

22. The non-transitory computing readable storage medium of claim 19, wherein the received resource allocation data further includes a resource permission set in each of the plurality of computing devices in response to a displayed resource utilization map.

23. The non-transitory computing readable storage medium of claim 19, wherein the specified computing devices of the plurality of computing devices include all subscribing computing devices.

24. The non-transitory computing readable storage medium of claim 19, wherein the specified computing devices of the plurality of computing devices include all computing devices that reported the resource allocation data to the server.

* * * * *